(12) United States Patent
Yilbas et al.

(10) Patent No.: US 8,160,846 B2
(45) Date of Patent: Apr. 17, 2012

(54) METHOD OF MODELING PHASE CHANGES DUE TO LASER PULSE HEATING

(75) Inventors: Bekir Sami Yilbas, Dhahran (SA); Saad Bin Mansour, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 471 days.

(21) Appl. No.: 12/453,656

(22) Filed: May 18, 2009

(65) Prior Publication Data

US 2010/0292965 A1 Nov. 18, 2010

(51) Int. Cl.
*G06F 7/60* (2006.01)
*G06F 17/10* (2006.01)

(52) U.S. Cl. ......................................................... 703/2
(58) Field of Classification Search ........................ 703/2
See application file for complete search history.

(56) References Cited

U.S. PATENT DOCUMENTS

| 5,092,179 A | 3/1992 | Ferguson |
| 6,631,647 B2 | 10/2003 | Seale |
| 6,868,735 B2 | 3/2005 | Takahashi |
| 6,871,162 B2 | 3/2005 | Futamura et al. |
| 6,874,370 B1 | 4/2005 | Vachon |

FOREIGN PATENT DOCUMENTS

| JP | 2004164453 A | 6/2004 |
| JP | WO2004048940 A3 | 6/2004 |
| JP | 2004330212 A | 11/2004 |
| JP | 2005148016 A | 6/2005 |
| JP | 2007210528 A | 8/2007 |
| JP | 2007309704 A | 11/2007 |
| JP | 2008015780 A | 1/2008 |

OTHER PUBLICATIONS

Yilbas, B.S., et al., "Laser Pulse Heating and Phase Changes in the Irradiated Region: Temperature-Dependent Thermal Properties Case", Jun. 26, 2008, Elsevier Masson SAS.*
Yilbas, B.S., et al., "Laser Pulse Heating and Vapor Front Generation", Mar. 2008, AIChE Journal, vol. 54, No. 3.*
Yilbas, B.S, et al., "Laser Pulse Heating: Cavity Formation into Steel, Nickel, and Tantalum Surfaces", Dec. 11, 2007, Elsevier Ltd.*
Yilbas, B.S. et al., "Laser Heatin: Jet Emanating from Laser Induced Cavity", Aug. 22, 2006, Elsevier Masson SAS.*
Yilbas, B.S., et al., "Laser Evaporative Heating of Surface: Simulation of Flow Field in the Laser Produced Cavity", Aug. 17, 2006, Journal of Physics D: Applied Physics 39, IOP Publishing Ltd.*
Yilbas, B.S., et al., "Laser-Pulsed Heating of Aluminum: Cavity Formation at the Surface", Dec. 2008, ASM International.*
B.S. Yilbas and S.B. Mansour, "Laser pulse heating and phase changes in the irradiated region: Temperature-dependent thermal properties case", published online at www.sciencedirect.com on Jun. 26, 2008.

* cited by examiner

*Primary Examiner* — Paul Rodriguez
*Assistant Examiner* — Cedric D Johnson
(74) *Attorney, Agent, or Firm* — Richard C. Litman

(57) ABSTRACT

The method of modeling phase changes due to laser pulse heating utilizes energy equations and a discretizing numerical method to model temperature variation and cavity depth in a substrate material due to laser heating. Both constant and temperature-dependent thermal properties cases are considered.

7 Claims, 22 Drawing Sheets

METHOD OF MODELING PHASE CHANGES DUE TO LASER PULSE HEATING

BACKGROUND OF THE INVENTION

1. Field of the Invention

The present invention relates to numerical modeling and simulation methods, and particularly to a method of modeling phase changes due to laser pulse heating that utilizes energy equations and a discretizing numerical method to model temperature variation and cavity depth in a substrate material due to laser heating.

2. Description of the Related Art

In thermodynamics, a phase transition is the transformation of a thermodynamic system from one phase to another. At phase-transition point, physical properties may undergo abrupt changes, such as changes in volume, for example. Phase transitions, such as those caused by laser heating of a substrate material, typically occur between solid and liquid phases, and between liquid and vapor phases.

First-order phase transitions are those that involve a latent heat. During such a transition, a system either absorbs or releases a fixed (and typically large) amount of energy. During this process, the temperature of the system will stay constant as heat is added. Because energy cannot be instantaneously transferred between the system and its environment, first-order transitions are associated with "mixed-phase regimes" in which some parts of the system have completed the transition and others have not. This phenomenon is familiar to anyone who has boiled a pot of water, i.e., the water does not instantly turn into gas, but forms a turbulent mixture of water and water vapor bubbles. Mixed-phase systems are difficult to study, because their dynamics are violent and hard to control. However, many important phase transitions fall in this category, including the solid/liquid/gas transitions.

The equations governing such phase transitions are complex and, in some cases, impossible to solve analytically. Numeric methods must be applied, and since numerical techniques for partial differential equations often require a large amounts of time and computing power, it is difficult to develop effective numerical techniques for the calculation of phase-change related properties.

Thus, a method of modeling phase changes due to laser pulse heating solving the aforementioned problems is desired.

SUMMARY OF THE INVENTION

The method of modeling phase changes due to laser pulse heating utilizes energy equations and a discretizing numerical method to model temperature variation and cavity depth in a substrate material due to laser heating. Both constant and temperature-dependent thermal properties cases are considered. The method includes the steps of:

(a) establishing a set of variables $S_o$, $I_o$, $\delta$, $r_f$, a, t, r, T, z, $\rho_s$, $c_{p_s}$ and $k_s$, wherein the variable $S_0$ represents a volumetric source term, the variable $I_o$ represents a laser peak power intensity, the variable $\delta$ represents an absorption coefficient for a substrate material, the variable $r_f$ represents reflectivity of the substrate material, the variable a represents a Gaussian parameter, the variable t represents time, the variable r represents distance measured along a radial direction, T represents temperature, z represents an axial distance, $\rho_s$ represents a solid density, $c_{p_s}$ represents a specific heat capacity of a solid phase of the substrate material, and $k_s$ represents a thermal conductivity of the solid phase of the substrate material;

(b) calculating temperature variation and cavity depth in the substrate material due to laser heating for solid and liquid heating of the substrate material as $$\frac{\partial}{\partial t}(\rho_s c_{p_s} T) = \frac{1}{r}\frac{\partial}{\partial r}\left(k_s r \frac{\partial T}{\partial r}\right) + \frac{\partial}{\partial z}\left(k_s \frac{\partial T}{\partial z}\right) + S_o,$$

wherein $$S_o = I_o \delta (1 - r_f) \exp(-\delta z) \exp\left(-\frac{r^2}{a^2}\right);$$

(c) establishing boundary conditions for the calculation of temperature variation and cavity depth in the substrate material for solid and liquid heating;

(d) establishing a set of variables $\rho_m$, $L_m$, $x_m$, and $k_m$, wherein $\rho_m$ represents a density at a solid-liquid interface, $L_m$ represents a latent heat of melting, $x_m$ represents a mass fraction of liquid, and $k_m$ represents a thermal conductivity at the solid-liquid interface of the substrate material;

(e) calculating temperature variation and cavity depth in the substrate material due to laser heating at the solid-liquid interface as $$\rho_m L_m \frac{\partial x_m}{\partial t} = \frac{1}{r}\frac{\partial}{\partial r}\left(k_m r \frac{\partial T}{\partial r}\right) + \frac{\partial}{\partial z}\left(k_m \frac{\partial T}{\partial z}\right) + S_o;$$

(f) establishing a set of variables $\rho_b$, $L_b$, $x_b$, and $k_b$, wherein $\rho_b$ represents a density at a liquid-vapor interface, $L_b$ represents a latent heat of boiling, $x_b$ represents a mass fraction of vapor, and $k_b$ represents a thermal conductivity at the liquid-vapor interface of the substrate material;

(g) calculating temperature variation and cavity depth in the substrate material due to laser heating at the liquid-vapor interface as $$\rho_b L_b \frac{\partial x_b}{\partial t} = \frac{\partial}{\partial r}\left(k_b r \frac{\partial T}{\partial r}\right) + \frac{\partial}{\partial z}\left(k_b \frac{\partial T}{\partial z}\right) + S_o,$$

wherein calculation of temperature variation and cavity depth in the substrate material due to laser heating for solid and liquid heating, at the solid-liquid interface, and at the liquid-vapor interface is performed by discretization; and (h) displaying numerical results of the calculated temperature variation and cavity depth in the substrate material due to laser heating for solid and liquid heating at the solid-liquid interface and at the liquid-vapor interface.

In the above, the boundary conditions for the calculation of temperature variation and cavity depth in the substrate material at the solid-liquid interface are set as T for both r and z are modeled as being an infinite distance from the substrate material being equal to $T_0$, wherein $T_0$ represents an initial temperature of the substrate material. Further, at an axis of symmetry of the substrate material, $$\frac{\partial T(0, z, t)}{\partial r} = 0,$$

and at a surface of the substrate material, $$k\frac{\partial T(r,0,t)}{\partial z} = h(T(r,0,t) - T_0),$$

wherein h represents a convective heat transfer coefficient at the surface of the substrate material and k represents thermal conductivity at the surface of the substrate material. An energy content $\Delta U$ of a differential element having a volume $\Delta\forall$ at a melting temperature $T_m$ of the substrate material in the calculation of temperature variation and cavity depth at the solid-liquid interface is given by $\Delta U = \rho_m \Delta\forall \lfloor x_m(L_m + c_{p_m}(T_m - T_{ref})) + c_{p_s}(1-x_m)(T_m - T_{ref}) \rfloor$, wherein $c_{pm}$ represents a specific heat capacity at the solid-liquid interface and $T_{ref}$ represents a reference temperature. The mass fraction of liquid $x_m$ is given by $$x_m = \frac{m_m}{m_m + m_s},$$

wherein $m_m$ represents a liquid mass and $m_s$ represents a solid mass.

The discretization is performed using the following steps:

(a) establishing a set of variables $\rho$, p, i, j, a, b, C, E, W, N, S and H, wherein p represents a time index, i represents an r-coordinate index, j represents a z-coordinate index, $\rho$ represents density, and a, b, C, F, W, N, S and H are intermediate variables;

(b) discretizing the calculation of temperature variation and cavity depth in the substrate material due to laser heating for solid and liquid heating as $$a_C T_{i,j}^p = a_E T_{i+1,j}^p + a_W T_{i-1,j}^p + a_N T_{i,j+1}^p + a_S T_{i,j-1}^p + T_{i,j}^{p-1} + a_H S_{i,j}^p,$$

wherein $$a_E = \frac{\alpha \Delta t(r_i + 0.5\Delta r)}{r_i(\Delta r)^2}, \quad a_W = \frac{\alpha \Delta t(r_i - 0.5\Delta r)}{r_i(\Delta r)^2},$$

$$a_N = a_S = \frac{\alpha \Delta t}{(\Delta z)^2}, \quad a_H = \frac{\Delta t}{\rho Cp}, \text{ and } a_C = 1 + a_E + a_W + a_N + a_S;$$

(c) discretizing the calculation of temperature variation and cavity depth in the substrate material due to laser heating for the solid-liquid interface as:

$$x_{bi,j}^p =$$
$$c_E T_{i+1,j}^p - c_C T_{i,j}^p + c_W T_{i-1,j}^p + c_Z(T_{i,j+1}^p - 2T_{i,j}^p + T_{i,j-1}^p) + c_H S_{i,j}^p + x_{bi,j}^{p-1},$$

wherein $$c_E = \frac{\alpha_b Cp_b \Delta t(r_i + 0.5\Delta r)}{L_b r_i(\Delta r)^2}, \quad c_W = \frac{\alpha_b Cp_b \Delta t(r_i - 0.5\Delta r)}{L_b r_i(\Delta r)^2},$$

$$c_C = c_E + c_W, \quad c_N = c_S = \frac{\alpha_b Cp_b \Delta t}{L_b(\Delta z)^2}, \text{ and } b_H = \frac{\Delta t}{\rho_b L_b};$$

(d) discretizing the calculation of temperature variation and cavity depth in the substrate material due to laser heating for the liquid-vapor interface as:

$$x_{bi,j}^p =$$
$$c_E T_{i+1,j}^p - c_C T_{i,j}^p + c_W T_{i-1,j}^p + c_Z(T_{i,j+1}^p - 2T_{i,j}^p + T_{i,j-1}^p) + c_H S_{i,j}^p + x_{bi,j}^{p-1},$$

wherein $$c_E = \frac{\alpha_b Cp_b \Delta t(r_i + 0.5\Delta r)}{L_b r_i(\Delta r)^2}, \quad c_W = \frac{\alpha_b Cp_b \Delta t(r_i - 0.5\Delta r)}{L_b r_i(\Delta r)^2},$$

$$c_C = c_E + c_W, \quad c_N = c_S = \frac{\alpha_b Cp_b \Delta t}{L_b(\Delta z)^2}, \text{ and } b_H = \frac{\Delta t}{\rho_b L_b};$$

wherein $$S_{i,j}^p = I_o(t)\delta(1 - r_f)\exp(-\delta z_j)\exp(-r_i^2/a^2).$$

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

High power interaction with a solid substrate, such as application of a laser pulse, results in solid heating of the bulk of the solid substrate and subsequent melting and evaporation of the irradiated surface. Since the process is relatively fast and involves high temperatures (for short laser pulses), modeling of the laser-solid interaction process is of great importance. Model studies and simulations provide insight into the physical processes taking place during the course of interaction. When modeling such physical processes, phase changes and "mushy zone" formation across each phase should be considered. The "mushy zone" is a term of art indicating a region of mixed solid phase and liquid phase, such as that which often occurs during the cooling of a binary alloy.

Although the mushy zone generated between co-existing phases is typically relatively small in size, the consideration of the mushy zone is essential in capturing the actual physical processes. Since the material properties vary with temperature, temperature dependent thermophysical properties are utilized in the simulations and modeling described below.

Figure 1:
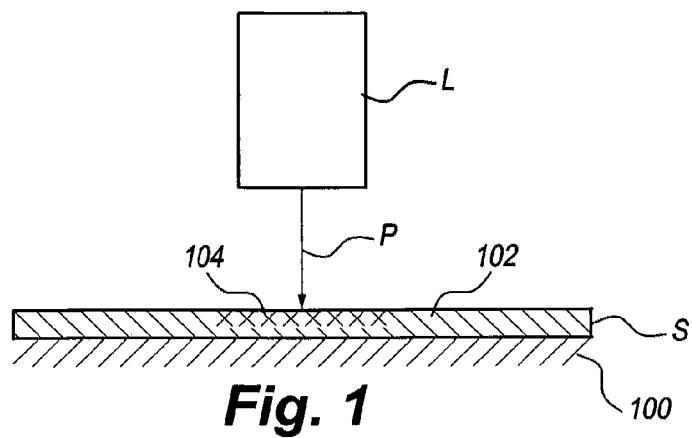
FIG. 1 is a diagrammatic view of a system for laser pulse heating.

In the following, the energy equations for each phase are solved independently, as well as being coupled across the interfaces of the two phases, where both phases exist mutually (i.e., in mushy zones). In the case of constant properties, the governing equations of heat transfer and the mushy zone are solved numerically, assuming all of the thermal properties are held constant. The laser output power intensity distribution at the workpiece surface is considered as Gaussian and its center is located at the center of the coordinate system. The temporal variation of laser power intensity resembling the actual laser pulse is accommodated in the simulations. This arrangement results in an axi-symmetric heating of the workpiece material. The method of modeling described below relates to a general laser-pulse system, such as that illustrated diagrammatically in FIG. 1. In FIG. 1, a substrate workpiece S rests on a support surface 100. Laser L generates a laser pulse P over a short time-duration. The solid portion of substrate workpiece S is indicated generally as 102, and 104 represents a mushy zone, i.e., a mixture of solid and liquid material created by the melting generated by the heating laser pulse P.

The heat conduction equation for solid phase heating due to a laser irradiation pulse having a Gaussian intensity profile is given by:

$$\frac{\partial}{\partial t}(\rho_s c_{p_s} T) = \frac{1}{r}\frac{\partial}{\partial r}\left(k_s r \frac{\partial T}{\partial r}\right) + \frac{\partial}{\partial z}\left(k_s \frac{\partial T}{\partial z}\right) + S_o, \qquad (1)$$

where $S_o$ represents the volumetric source term and is given by:

$$S_o = I_o \delta (1 - r_f) \exp(-\delta z) \exp\left(-\frac{r^2}{a^2}\right), \qquad (2)$$

and $I_o$, $\delta$, $r_f$ and a respectively represent the laser peak power intensity, absorption coefficient, reflectivity and the Gaussian parameter. The variable t represents time (measured in seconds), the variable r represents distance measured along the radial direction (measured in meters), T represents temperature (measured in K), z is an axial distance (measured in meters), $\rho_s$ represents the solid density (measured in kg/m³), $c_{p_s}$ represents the specific heat capacity of the solid phase (measured in J/kg/K), and $k_s$ is the thermal conductivity of the solid phase (measured in W/m/K).

The initial and boundary conditions for equation (1) are given below. Initially, the substrate material is assumed to have a uniform temperature $T_o$, i.e., at time $t=0$: $T(r,z,0)=T_o$, which is a pre-specified (or pre-measured) value. For purposes of modeling, at a distance considerably far away from the surface (i.e., considered to be at infinity in the method of modeling) in the radial direction, a constant temperature $T_o$ is assumed. Since the heating has no effect on the temperature rise at a depth of infinity below the surface, temperature is assumed to be constant and equal to the initial temperature of the substrate material in this region. The respective boundary conditions are $r=\infty$: $T(\infty,z,t)=T_o$; and $z=\infty$: $T(r,\infty,t)=T_o$.

At the axis of symmetry, maximum temperature is assumed, and the convection boundary condition is considered both at the workpiece surface, i.e. at the axis of symmetry, $$r = 0: \; \frac{\partial T(0, z, t)}{\partial r} = 0,$$

and at the surface, $$z = 0: k\frac{\partial T(r, 0, t)}{\partial z} = h(T(r, 0, t) - T_o),$$

where h is the convective heat transfer coefficient (measured in W/m²/K), and is taken as 10 W/m²/K due to natural convection from the surface prior to evaporation, using steel as an exemplary material for substrate workpiece S.

Since the evaporation temperature depends on the pressure, and this relation is not known for steel vapor, it is assumed that the substrate material has single melting and boiling temperatures. Further, once the phase change initiates, a mushy zone (i.e., the mutual existence of two phases) is introduced across the interface of the two phases. During the phase change process, including the mushy zone, the temperature of the substrate material remains the same, but its enthalpy changes in this region. This situation can be formulated via energy balance in the mushy zone. It should be noted that a typical, nominal laser pulse duration for a process such as this is 24 ns, thus the flow in the vapor and liquid layer during the heating process is neglected, i.e., 1 micron of fluid motion, in the radial or axial direction, in the liquid layer requires a liquid velocity on the order of 1000 m/s. Thus, during the short heating period, the fluid motion in the liquid and vapor layers is assumed not to influence the heat transfer mechanism in these zones.

Considering a differential element in the mushy zone and letting $x_m$ represent the mass fraction of liquid present in the element, then the energy content $\Delta U$ of the differential element with a volume $\Delta \forall$ at the melting temperature $T_m$ is given by:

$$\Delta U = \rho_m \Delta \forall \left[ x_m(L_m + c_{p_m}(T_m - T_{ref})) + c_{p_s}(1 - x_m)(T_m - T_{ref}) \right], \qquad (3)$$

$$\text{where } x_m = \frac{m_m}{m_m + m_s},$$

and $T_{ref}$, $m_m$, $m_s$ are, respectively, the reference temperature for enthalpy, the mass of liquid, and the mass of solid in the element. Assuming that the specific heat of melting is the same as that of the solid at the melting temperature (i.e., $c_{ps}=c_{pm}$ at $T=T_m$), then differentiation of equation (3) with respect to time yields:

$$\frac{\partial u}{\partial t} = \rho_m L_m \frac{\partial x_m}{\partial t} \qquad (4)$$

since $$c_{pm}(T_m - T_{ref}) = const. \text{ and } u = \frac{U}{\forall},$$

where "const." represents a constant value, and u represents the energy density.

Substituting equation (4) into equation (1) provides the energy equation for the differential element in the mushy zone:

$$\rho_m L_m \frac{\partial x_m}{\partial t} = \frac{1}{r}\frac{\partial}{\partial r}\left(k_m r \frac{\partial T}{\partial r}\right) + \frac{\partial}{\partial z}\left(k_m \frac{\partial T}{\partial z}\right) + S_o. \qquad (5)$$

Equation (5) is valid in the mushy zone where $0 \leq x_m \leq 1$, i.e., when the temperature of the cells with $0 \leq x_m \leq 1$ is set to the melting temperature ($T=T_m$). In the above, $L_m$ is the latent heat of melting (measured in J/kg). For the situation of $x_m=1$, the liquid phase occurs and equation (1) is used to determine the temperature rise in the liquid heating using the liquid thermal properties of the equation. Further, the liquid heating continues until the boiling point is reached in the substrate material, at which point a new mushy zone is formed. In this situation, equation (5) is modified for a differential element in the mushy zone subjected to evaporation, given by:

$$\rho_b L_b \frac{\partial x_b}{\partial t} = \frac{1}{r}\frac{\partial}{\partial r}\left(k_b r \frac{\partial T}{\partial r}\right) + \frac{\partial}{\partial z}\left(k_b \frac{\partial T}{\partial z}\right) + S_o. \qquad (6)$$

Equation (6) is applicable for temperatures $T=T_b$ and $0 \leq x_b \leq 1$ in the mushy zone (i.e., partial liquid and partial vapor zone), where $T_b$ represents the evaporation temperature and $x_b$ is the mass fraction in the vapor-liquid mushy zone. At this point, the temperature of the cells with $0 \leq x_b \leq 1$ is set to the boiling temperature of the substrate material $T=T_b$. It should be noted that $x_m$ is replaced with $x_b$ in equation (5), which represents the fraction of vapor phase in the differential element. The calculation of $x_b$ is the same as that given above for $x_m$, provided that latent heat of fusion is replaced with latent heat of evaporation of the substrate material.

The boundary condition at the evaporating surface relates to equation (6). In this case, the temperature along the evaporated surface is kept at the boiling temperature of the substrate material, i.e., the cells in the evaporated region are kept at the boiling temperature, or, in the mushy zone, $z=z_b \Rightarrow T(r,z_b,t)=T_b$, where $z_b$ represents the axial location at the evaporated surface. Equations (5) and (6) provide the relative position of the solid-liquid and liquid-vapor interfaces in the substrate material. The liquid-vapor interface determines the shape and size of the cavity generated during the evaporation process.

With regard to generation of a numerical solution, equation (1) is applicable to solid and liquid heating, equation (5) is applicable to the mushy zone at the solid-liquid interface, and equation (6) is applicable to the mushy zone at the liquid-vapor interface. In order to discretize the governing equations, a finite difference scheme is introduced. The details of the numerical scheme are given below in detail. In order to compute the equations discretized for temperature field and relative positions of solid-liquid and liquid-vapor interfaces, an implicit scheme is used, i.e., using the initial conditions, the temperature in the whole domain is calculated to follow time steps with the respective conditions. An exemplary temporal resolution for the implicit scheme is approximately $0.5 \times 10^{-9}$ s for a simulation.

Equations (1), (5) and (6) contain four main variables, namely $T_s$, $T_m$, $x_m$ and $x_b$. In the numerical implementation, $T_s$ and $T_m$ are considered to be the same variable, since solid and liquid do not exist simultaneously at a grid point. Where they do, they are described by means of the quality. Thus, only three equations need to be discretized. These equations contain the following generic derivative terms:

$$\frac{\partial T}{\partial t}, \frac{1}{r}\frac{\partial}{\partial r}\left(r\frac{\partial T}{\partial r}\right),$$

$$\frac{\partial^2 T}{\partial z^2} \text{ and } \frac{\partial x}{\partial t}.$$

Figure 2:
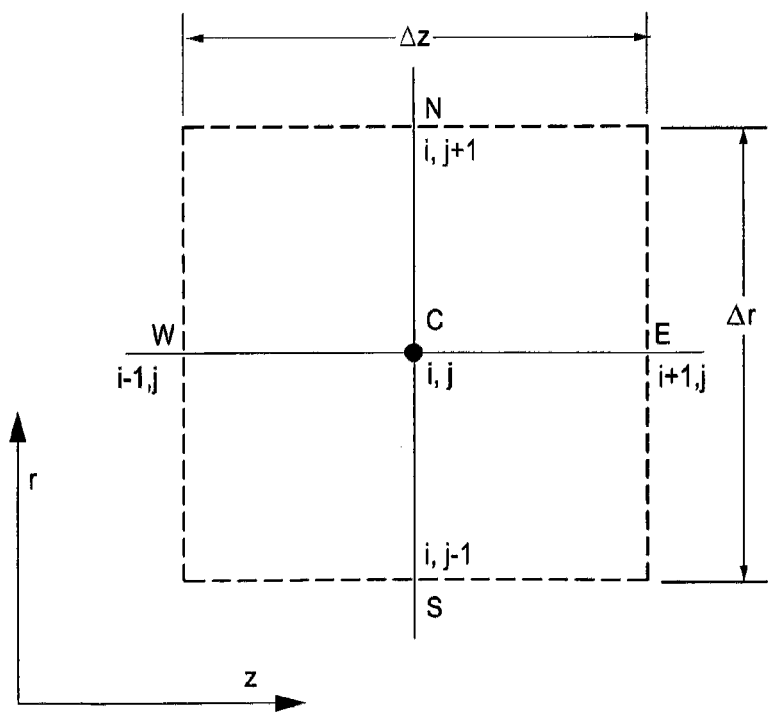
FIG. 2 diagrammatically illustrates an internal grid point, along with neighbors of the grid point, for axisymmetric laser heating of a substrate material.

For a grid point, for purposes of calculation, the variables C, E and W are defined as the grid point's r-direction neighbors, and N and S are defined as the grid point's z-direction neighbors, as illustrated by FIG. 2. For temporal derivatives, first-order backward differences are used, whereas for spatial derivatives, second-order central differences are used. These selections lead to an implicit numerical scheme.

The variable p is stet as the time index, i as the r-coordinate index and j as the z-coordinate index, leading to the discretized form of the equation (1), given by $$a_C T_{i,j}^p = a_E T_{i+1,j}^p + a_W T_{i-1,j}^p + a_N T_{i,j+1}^p + a_S T_{i,j-1}^p + T_{i,j}^{p-1} + a_H S_{i,j}^p, \qquad (7)$$

where $$a_E = \frac{\alpha \Delta t (r_i + 0.5\Delta r)}{r_i (\Delta r)^2}, a_W = \frac{\alpha \Delta t (r_i - 0.5\Delta r)}{r_i (\Delta r)^2},$$

$$a_N = a_S = \frac{\alpha \Delta t}{(\Delta z)^2}, a_H = \frac{\Delta t}{\rho C p}, \text{ and}$$

$$a_C = 1 + a_E + a_W + a_N + a_S.$$

For the solid phase, $\rho = \rho_s$ and $Cp = Cp_s(T)$, where $$\alpha = \frac{k_s(T)}{\rho_s Cp_s(T)}.$$

For the liquid phase, $\rho=\rho_l$ and $Cp=Cp_l(T)$, where $$\alpha = \frac{k_l(T)}{\rho_l Cp_l(T)}.$$

The discretized form of the equation determining the quality $x_m$ in the solid-liquid mushy zone yields:

$$x_{mi,j}^p = b_E T_{i+1,j}^p - b_C T_{i,j}^p + b_W T_{i-1,j}^p + \qquad (8)$$
$$b_Z(T_{i,j+1}^p - 2T_{i,j}^p + T_{i,j-1}^p) + b_H S_{i,j}^p + x_{mi,j}^{p-1},$$

where $$b_E = \frac{\alpha_m Cp_m \Delta t(r_i + 0.5\Delta r)}{L_m r_i (\Delta r)^2};$$

$$b_W = \frac{\alpha_m Cp_m \Delta t(r_i - 0.5\Delta r)}{L_m r_i (\Delta r)^2};$$

$$b_C = b_E + b_W;$$

$$b_N = b_S = \frac{\alpha_m Cp_m \Delta t}{L_m (\Delta z)^2};$$

and $$b_H = \frac{\Delta t}{\rho_m L_m}.$$

The discretized form of the equation determining the quality $x_b$ in the liquid-vapor mushy zone yields:

$$x_{bi,j}^p = c_E T_{i+1,j}^p - c_C T_{i,j}^p + c_W T_{i-1,j}^p + \qquad (9)$$
$$c_Z(T_{i,j+1}^p - 2T_{i,j}^p + T_{i,j-1}^p) + c_H S_{i,j}^p + x_{bi,j}^{p-1},$$

where $$c_E = \frac{\alpha_b Cp_b \Delta t(r_i + 0.5\Delta r)}{L_b r_i (\Delta r)^2},$$

$$c_W = \frac{\alpha_b Cp_b \Delta t(r_i - 0.5\Delta r)}{L_b r_i (\Delta r)^2},$$

$$c_C = c_E + c_W,$$

$$c_N = c_S = \frac{\alpha_b Cp_b \Delta t}{L_b (\Delta z)^2},$$

and $$b_H = \frac{\Delta t}{\rho_b L_b}.$$

For all above equations, the following relation holds:

$$S_{i,j}^p = I_o(t)\delta(1-r_f)\exp(-\delta z_j)\exp(-r_i^2/a^2). \qquad (10)$$

During laser heating of the substrate, it should be noted that when evaporation starts, the metal vapor is ejected from the substrate and leaves behind a cavity. The laser beam is now focused on the deformed surface of the substrate, which constitutes the cavity. This aspect must also be accommodated in the solution procedure. In this case, the heat source distribution must be modified so that its peak value always occurs at the substrate surface. The appropriate modifications to the above are:

$$S_{i,j}^p = I_o(t)\delta(1-r_f)\exp(-\delta(z_j-zc_i))\exp(-r_i^2/a^2)$$
$$(0 \leq r \leq r_{max}, z \geq zc_i)$$

$$S_{i,j}^p = I_o(t)\delta(1-r_f)\exp(-\delta z_j)\exp(-r_i^2/a^2)(r > r_{max}),$$

where $zc_i$ is the depth of the cavity, which varies with $r_i$ until $r=r_{max}$, where $zc=0$.

The calculation domain is divided into staggered grids and a grid independence test is then performed for the different grid sizes and orientations. A grid size resulting in a grid independent solution is used in the simulations, i.e., a grid preferably containing 100×120 mesh points in the r and z-axes is accommodated. In the z-axis, a spacing of $\Delta z = 3.2415 \times 10^{-8}$ m is used, while in the radial direction (normal to the laser beam axis), a $\Delta r = 8.3333 \times 10^{-8}$ m increment is selected. Since the first-order backward differences for time derivatives are used, the discretized equations constitute an implicit scheme. In the absence of convection terms, such as has been described above, this scheme is unconditionally stable with respect to the size of the time step $\Delta t$, given that the spatial steps $\Delta r$ and $\Delta z$ are fixed.

A set of exemplary material properties and a pulse intensity used in a simulation following the above methodology are given below in Table 1. It should be noted that the laser pulse properties employed in the simulation resembles an actual pulse used in experiments (illustrated in FIGS. 3A and 3B).

TABLE I

| | | |
|---|---|---|
| $k_s$ | $139.7356 - (0.1896)T + (0.0001)T^2$ | (W/mK) (solid phase) |
| $\rho_s$ | 7860 (Kg/m$^3$) (solid phase) | |
| $Cp_s$ | $110.0215 + (1.2405)T - (0.0006)T^2$ | (J/kgK) (solid phase) |
| $K_m$ | 37 (W/mK) (liquid phase) | |
| $\rho_m$ | 6891 7860 (Kg/m$^3$) (liquid phase) | |
| $Cp_m$ | 824 (J/kgK) (liquid phase) | |
| $K_b$ | $(0.9)k_m$ (W/mK) (vapor phase) | |
| $\rho_b$ | $\rho_m/15$ (Kg/m$^3$) (vapor phase) | |
| $Cp_b$ | $(1.1)Cp_m$ (vapor phase) | |
| $L_m$ | 247112 (J/kg) | |
| $T_m$ | 1811 (K) | |
| $L_b$ | 6213627 (J/kg) | |
| $T_b$ | 3134 (K) | |
| $T_o$ | 300 (K) | |
| $T_\infty$ | 300 (K) | |
| $\delta$ | $6.17 \times 10^6$ (1/m) | |
| $r_f$ | 0.5 | |
| $r_o$ | $1.25 \times 10^{-5}$ (m) | |
| a | $2r_o/3$ (m) | |
| $I_o$ | $5 \times 10^{12}$ (W/m$^2$) | |

TABLE I-continued

| | |
|---|---|
| 1 | $I_o \delta \exp(-\delta z)\exp\left(\left(\frac{r}{a}\right)^2\right)$ $\left(0.01057\left(\frac{t}{2.71 \times 10^{-8}}\right) + 0.01182\left(\frac{t}{2.71 \times 10^{-8}}\right)^2 + 750.00438\left(\frac{t}{2.71 \times 10^{-8}}\right)^3\right)$ $\exp\left(-10.11068\left(\frac{t}{2.71 \times 10^{-8}}\right)\right)$ |
| Nominal Pulse length | 24 (ns) |

In the above, laser evaporative heating and cavity formation in a solid substrate was modeled. An energy method was used to identify the mushy zones between solid-liquid and liquid-vapor phases. Constant and variable thermal properties of the substrate material were employed in the simulation to examine the influence of the substrate properties on the temperature field, the formation of the mushy zones, and the cavity size. Table 1 gives exemplary material properties and laser pulse parameters that may be used in the simulations.

FIGS. 4A, 4B, 4C and 4D illustrate the temperature contours and cavity formation in the surface region of the substrate material during two heating periods, and for constant and variable thermal properties of the substrate material. The cavity size particularly enlarges in the axial direction for the constant properties case, which is more pronounced in the early heating periods when laser pulse intensity increases with time. The decrease in cavity depth due to the variable thermal properties case is associated with the decrease in thermal conductivity and increase in specific heat capacity with increasing temperature, i.e., the thermal conductivity is 134 W/m/K at 100° C. and 31.2 W/m/K at 1500° C., while the specific heat is 216 J/kg/K at 100° C. and 654 J/kg/K at 1500° C. In this case, decreasing thermal conductivity results in small heat diffusion from the irradiated region to the solid bulk. However, increasing specific heat capacity reduces temperature rise in the irradiated region for the same internal energy gain for both constant and variable thermal properties cases. This, in turn, suppresses the melting and evaporation rates in the surface region. Consequently, cavity depth becomes shallower in the region, particularly where temperature rise in the substrate is high for the variable thermal properties case as compared to that of the constant properties case.

Figure 5A:
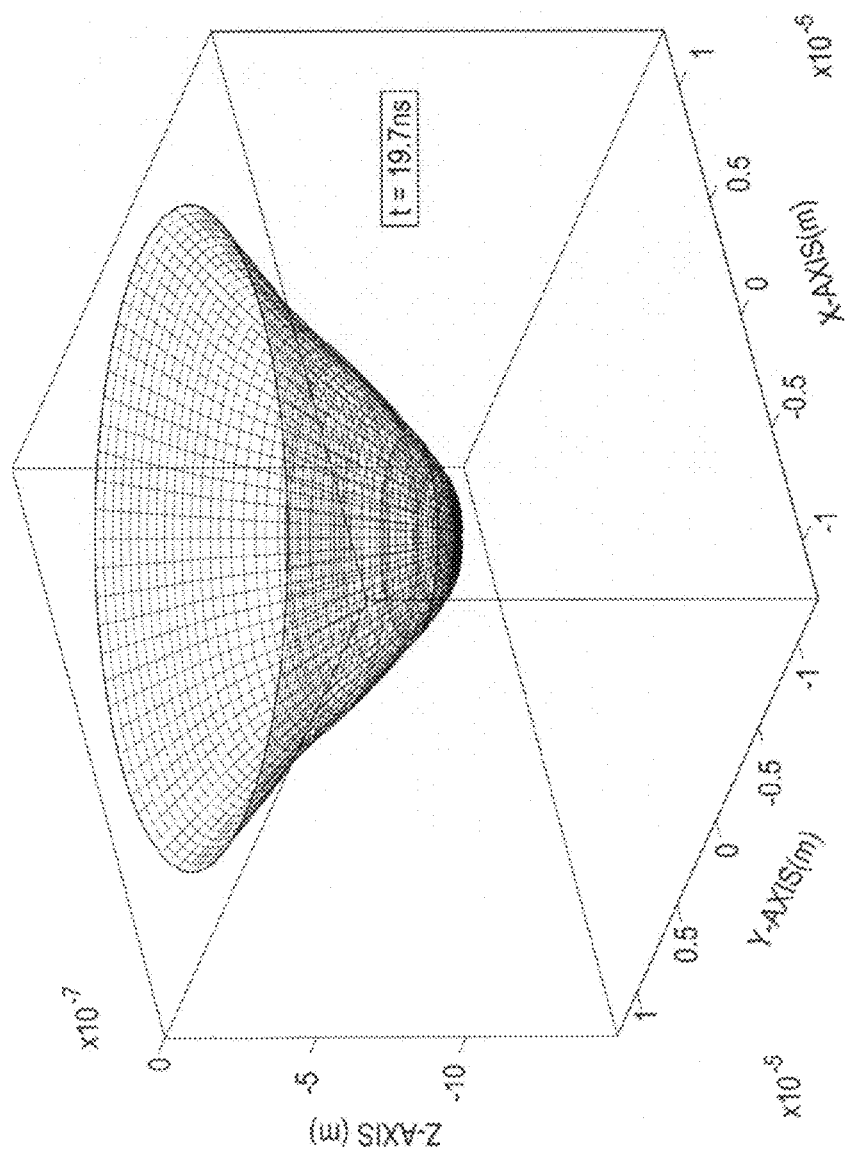
FIG. 5A is a three-dimensional chart illustrating a cavity shape for the variable thermal properties case at a heating duration of 19.7 ns.
Figure 5B:
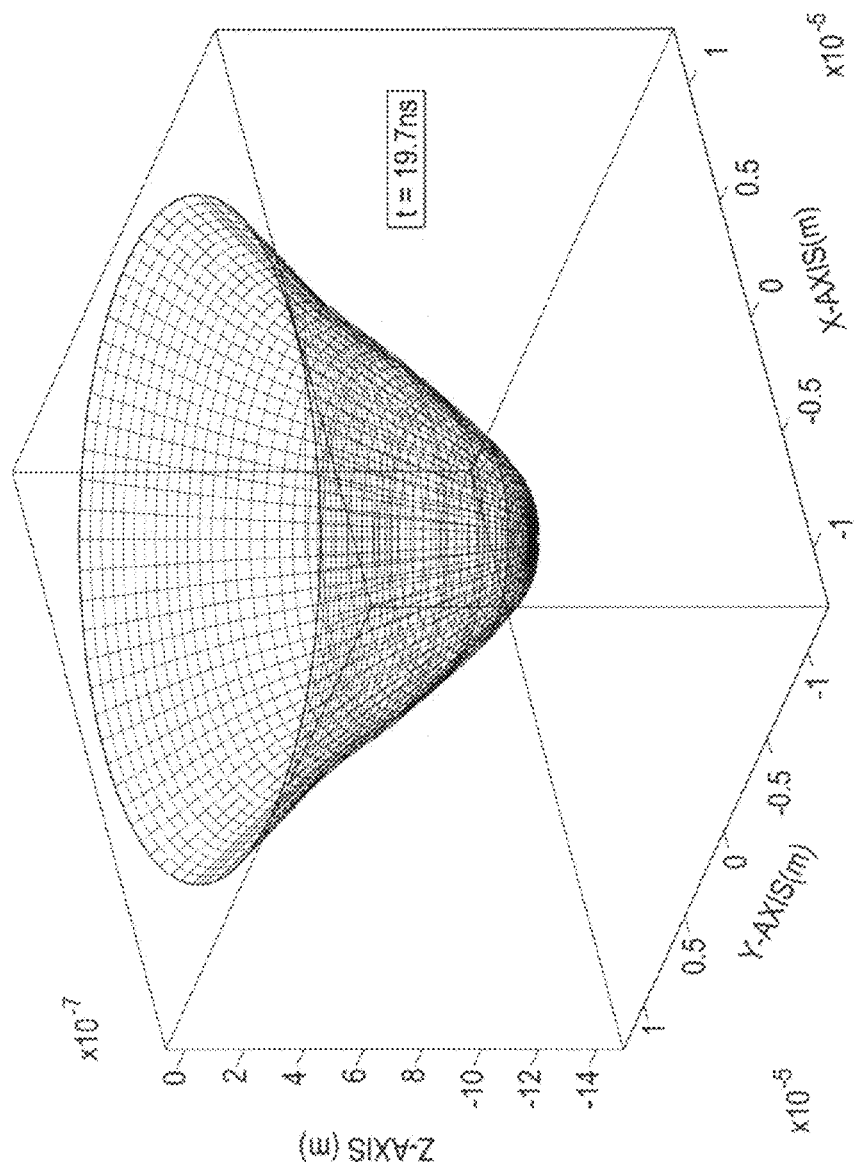
FIG. 5B is a three-dimensional chart illustrating a cavity shape for the constant thermal properties case at a heating duration of 19.7 ns.

The high temperature region extends along the axial direction in the axis of symmetry, where the absorbed laser power intensity is high. It should be noted that laser power intensity distribution at the substrate surface is Gaussian and the peak intensity occurs at the axis of symmetry. Increase in the cavity depth due to the constant properties case is almost twice of that corresponding to the variable thermal properties case during the heating pulse of 6 ns, while it is only 1.35 times after a 24 ns pulse, which corresponds to the time of 15 ns after the laser pulse ends. Consequently, enlargement in the cavity depth is significant during the heating pulse and then slows progression after the laser pulse ends. Further, an increase in the cavity depth after the laser pulse ends is associated with the convection heating of the cavity surface by the vapor front present in the cavity. A three-dimensional view of the cavity shape is shown in FIGS. 5A and 5B for the variable and constant thermal properties cases, respectively. Cavity enlargement in the axial direction is more pronounced than that along the radial direction.

Figure 6A:
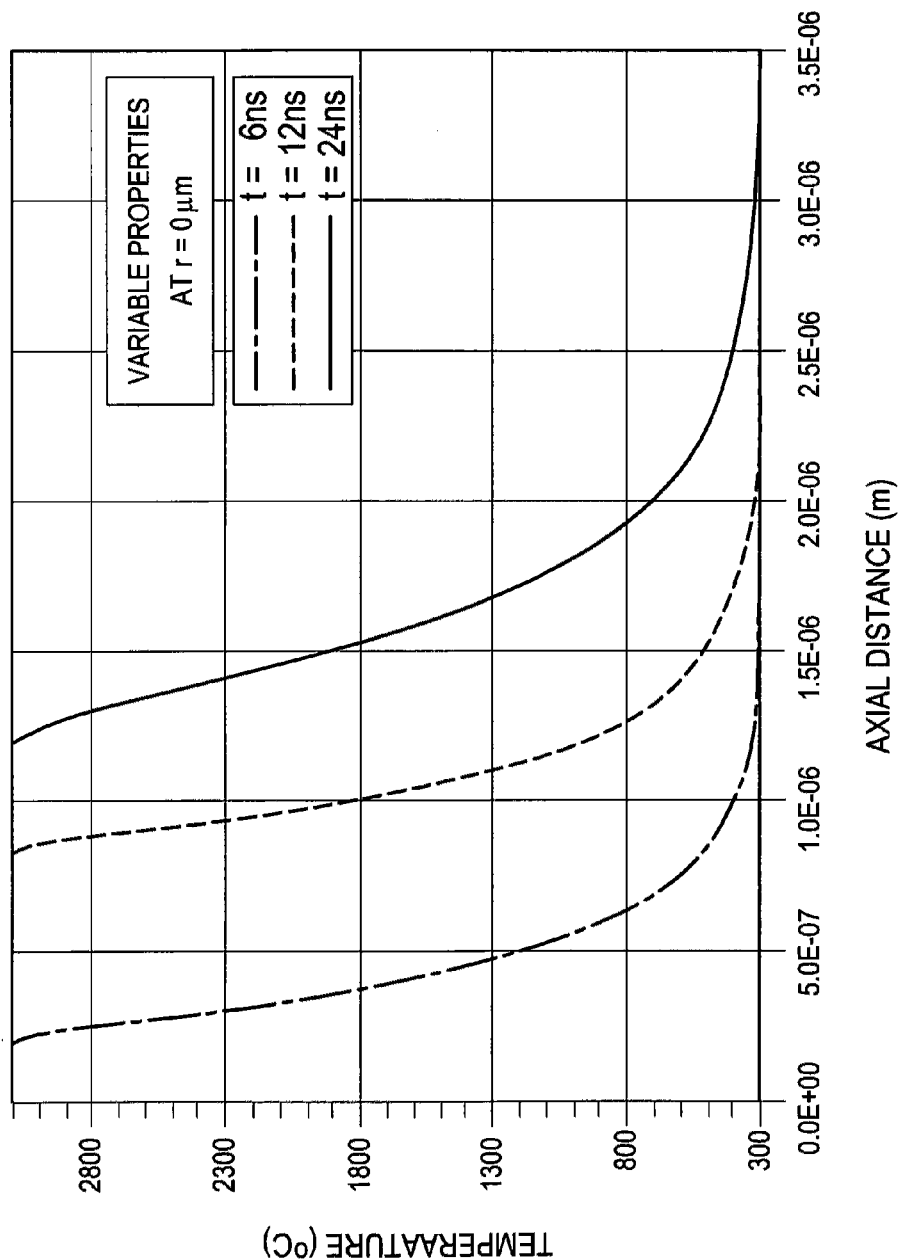
FIGS. 6A and 6B are charts illustrating the temperature distribution inside the substrate material along the axis of symmetry for the variable and constant thermal properties cases for differing heating durations.
Figure 6B:
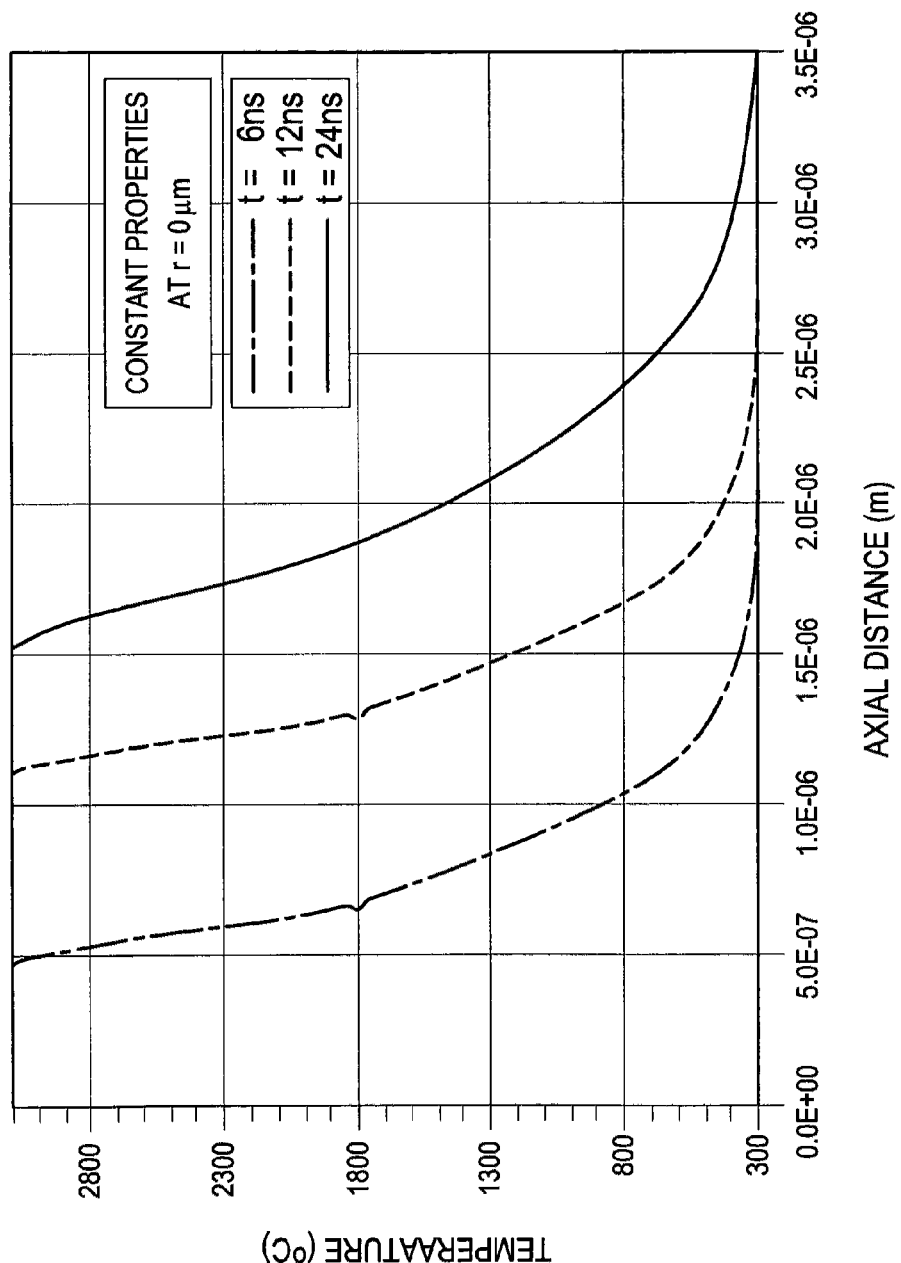

FIGS. 6A and 6B illustrate temperature distribution along the axis of symmetry inside the substrate material for the constant, as well as variable, thermal properties cases at different heating durations. It should be noted that temperature is limited to the evaporation temperature of the substrate material along the temperature axis in FIGS. 6A and 6B. Temperature decreases sharply in the liquid region (T>$T_m$) as compared to the solid region (T<$T_m$). The sharp decay of temperature can be related to the energy absorbed by the substrate material from the irradiated field in this region. It should be noted that the laser-absorbed energy decreases exponentially with the increasing depth below the surface (i.e., Lambert's Law). In the solid region, temperature decreases with increasing depth below the surface due to the diffusional energy transport in this region, since the solid region extends beyond the absorption depth. Thus, the contribution of irradiated energy to the temperature rise in the solid region is not significant, i.e., temperature decay in this region depends on a temperature gradient, which is the only driving force for diffusional heating in this region.

Figure 7A:
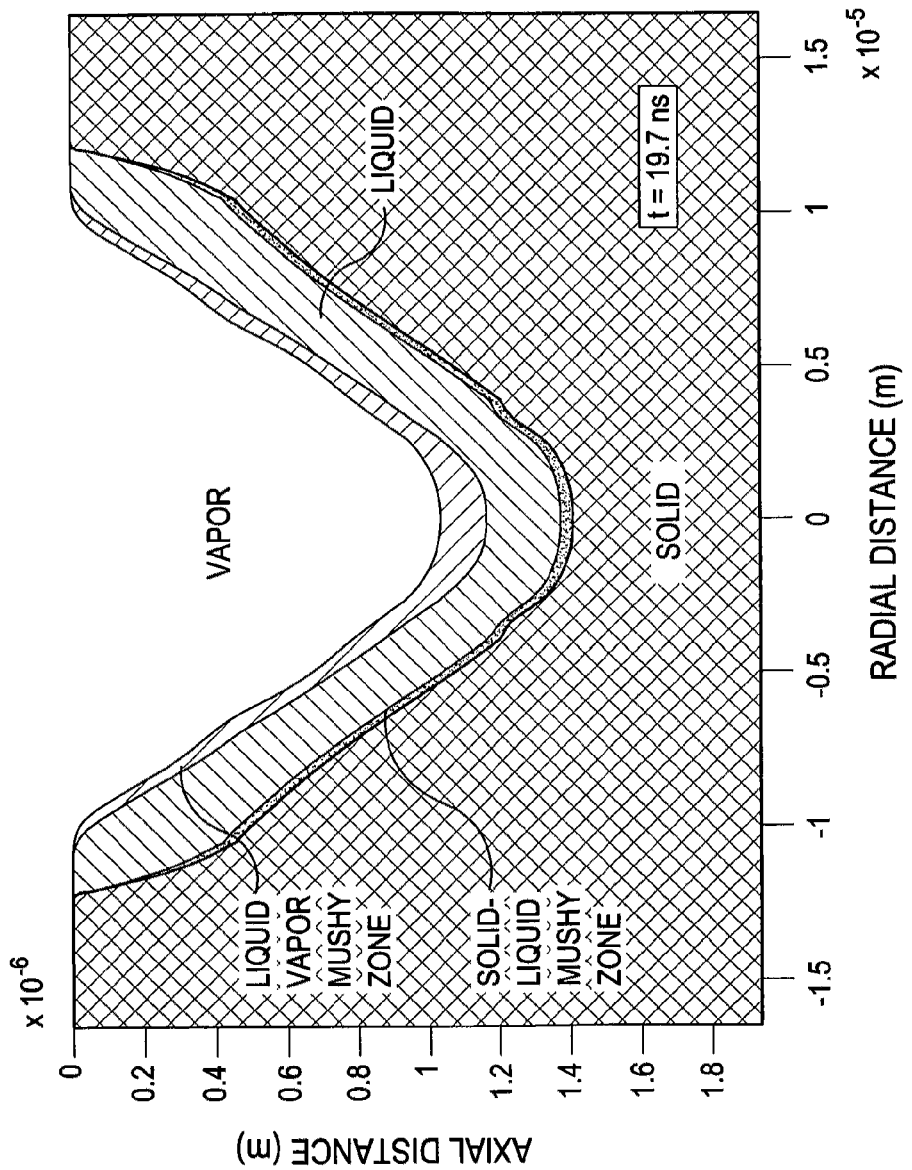
FIG. 7A is a chart illustrating a cavity cross-section for the variable thermal properties case.
Figure 7B:
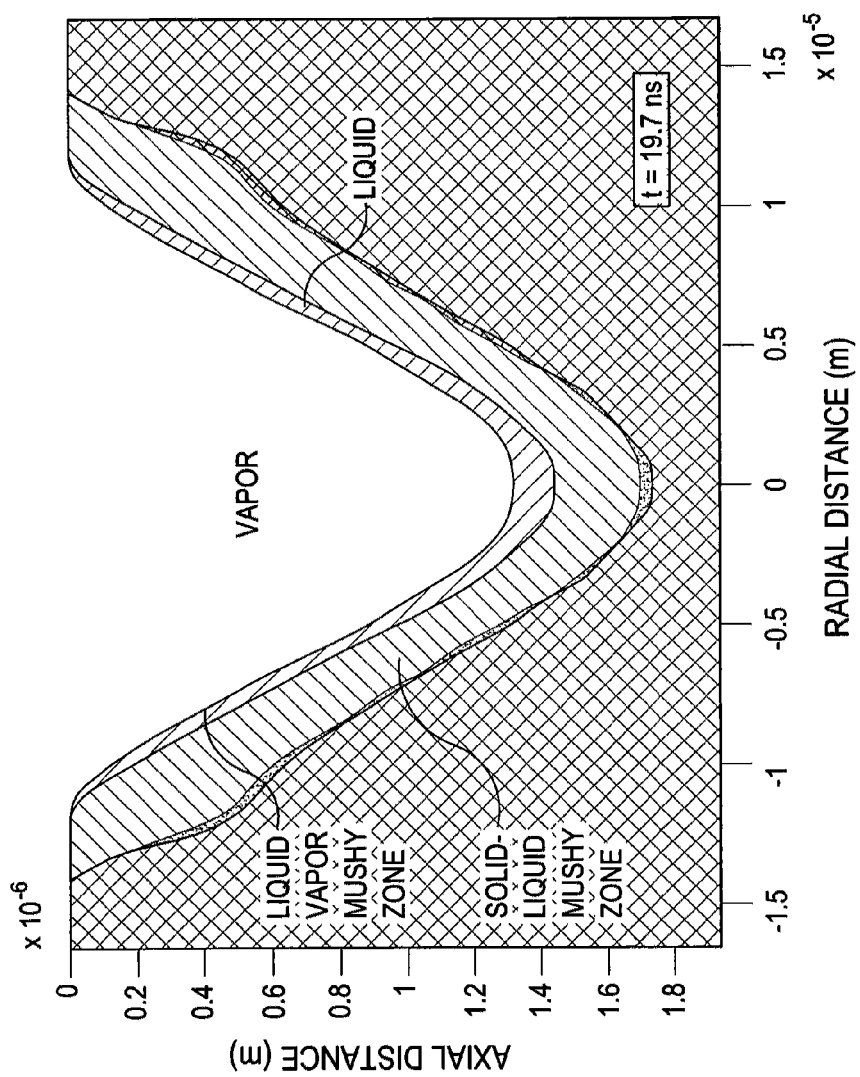
FIG. 7B is a chart illustrating a cavity cross-section for the constant thermal properties case.

As the temperature gradient reduces with increasing depth from the liquid-solid interface, temperature decay becomes gradual due to small diffusional energy transfer in this region. The mushy zone developed between the liquid-solid phases is evident for the constant properties case (i.e., temperature remains constant at melting temperature at a short depth). Further, the depth of the cavity is deeper for the constant properties case than in the variable thermal properties case. This situation is also seen in FIGS. 7A and 7B, in which a cross-sectional view of the heated regions is illustrated for both the variable and constant thermal properties cases, respectively. As shown, the temperature dependent properties have significant effects on the melting and evaporation rates of the substrate. Thus, thermal conductivity reduces with increasing temperature, which, in turn, results in a small rate of heat diffusion from the irradiated region to its neighborhood. However, increased specific heat capacity with temperature reduces temperature rise in the irradiated region, thus suppressing the melting and evaporation rates in this region. Consequently, increasing specific heat capacity and reducing thermal conductivity with increasing temperature yields a small cavity depth for the variable thermal properties case. The small size of the liquid-solid mushy zone is associated with the low rate of heat diffusion from the liquid to the solid phases as well as the low temperature rise in the liquid phase in the region next to the solid phase, i.e., reducing thermal conductivity with increasing temperature suppresses the diffusional energy transport from the liquid phase to the solid phase, while increasing specific heat capacity with increasing temperature lowers the temperature rise in the liquid region next to the solid phase.

Figure 8A:
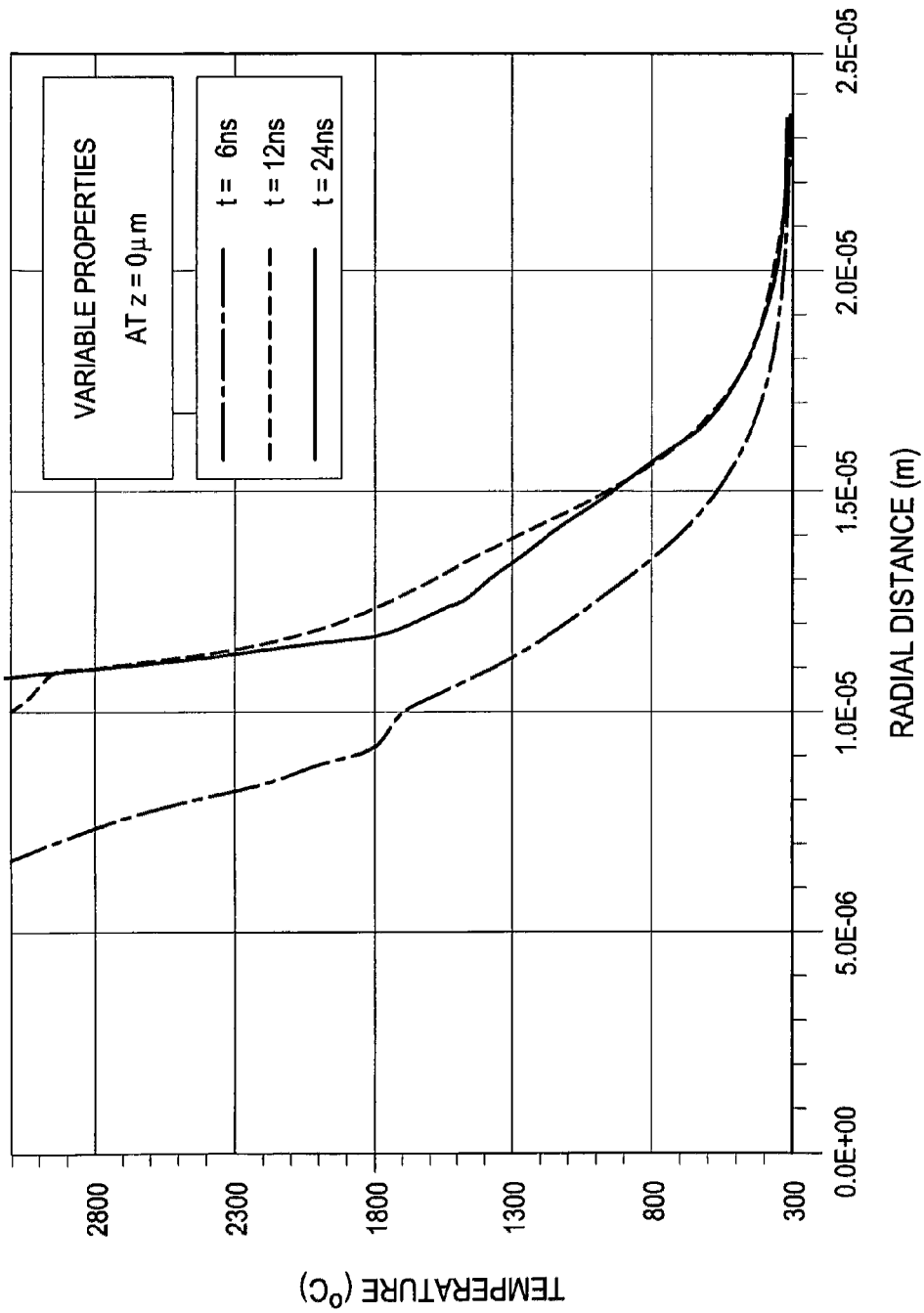
FIGS. 8A and 8B are charts illustrating temperature distribution along the radial axis for the variable and constant thermal properties cases.
Figure 8B:
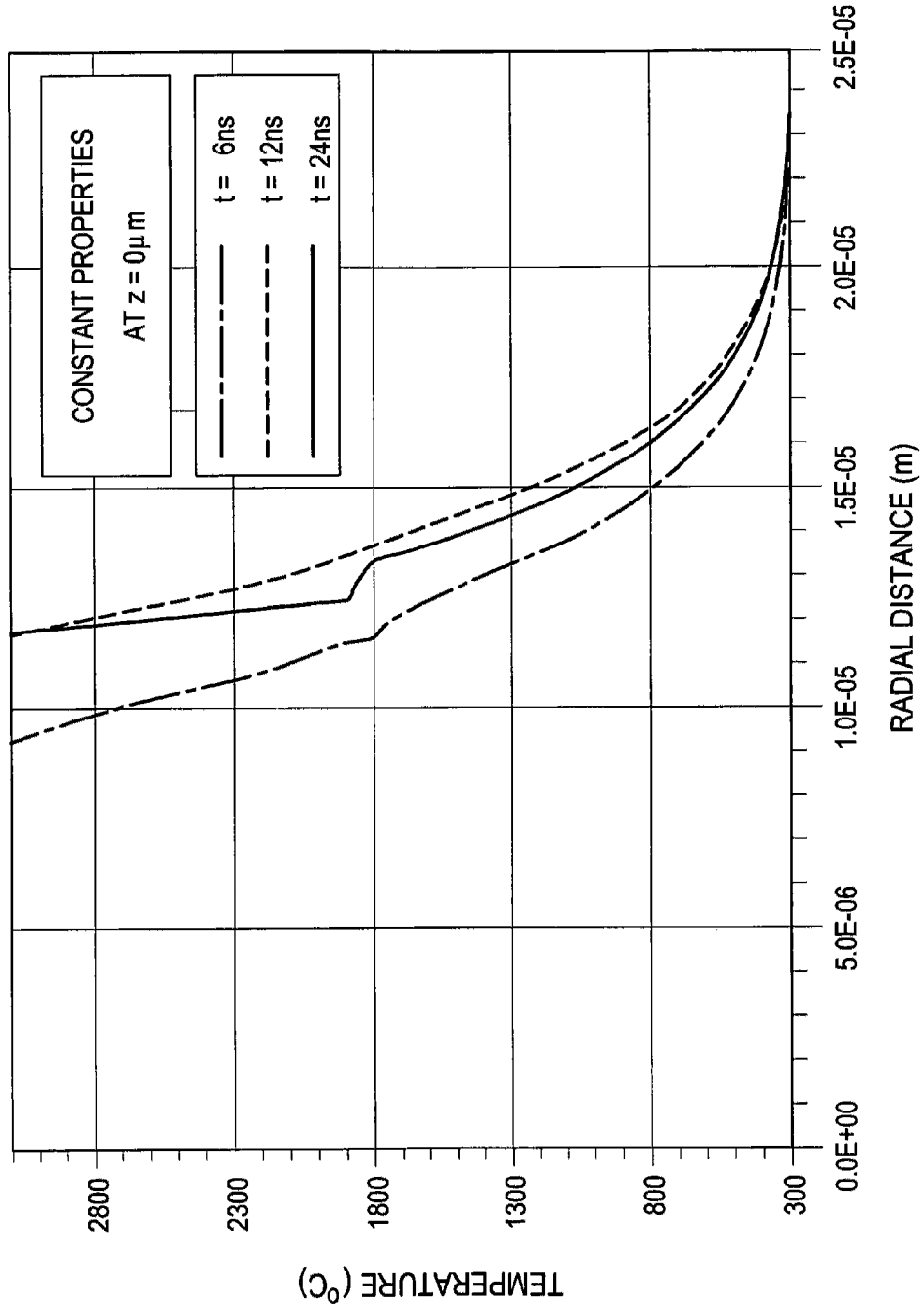

FIGS. 8A and 8B show the temperature distribution in the radial direction at the surface for the constant and variable thermal properties cases at different durations. The extension of the cavity size, as determined by the radial distance corresponding to the evaporation temperature, is evident for the constant properties case due to high heat rate of diffusion and high rise of temperature due to high thermal conductivity and low specific heat capacity. Further, convective cooling, as well as energy diffusion from the surface region to the solid bulk after the ending of the pulse, results in decay of temperature in the radial direction. This situation can be observed when comparing temperature profiles at 12 ns and 24 ns heating durations, i.e., cooling of the surface results in the temperature profile moving towards the symmetry axis (r=0) in the radial direction.

Figure 3A:
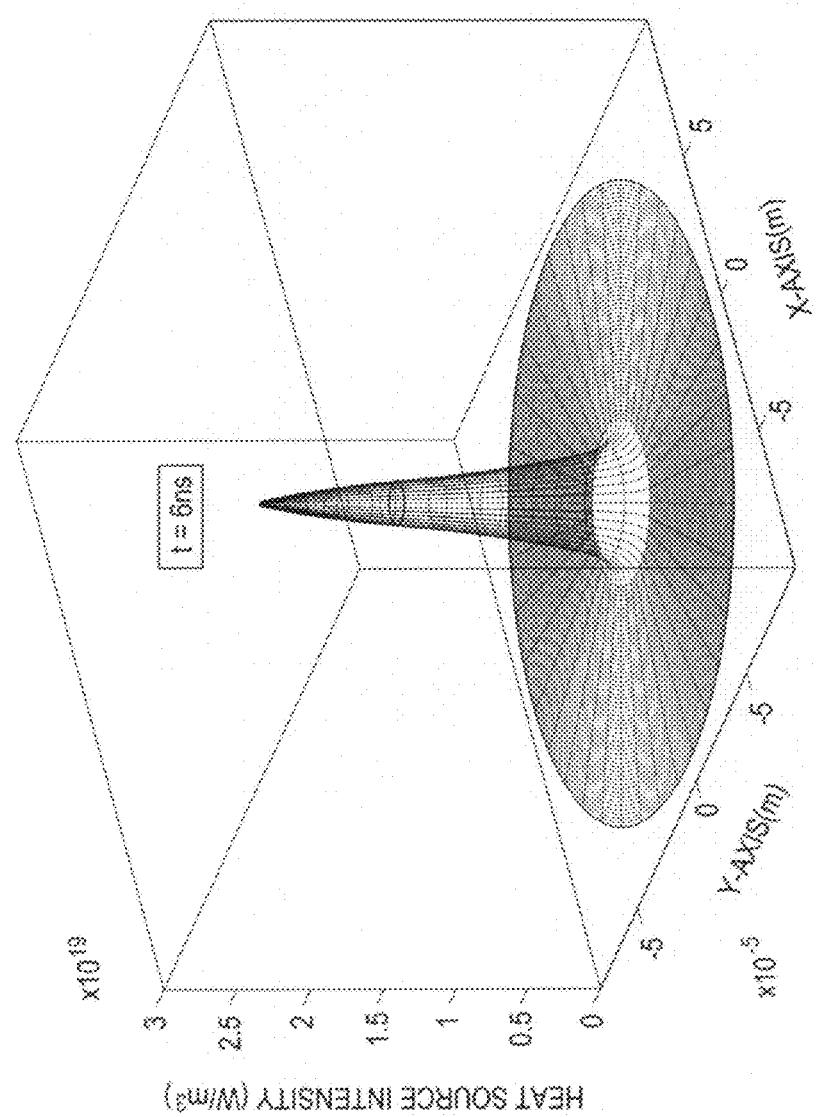
FIG. 3A is a three-dimensional chart illustrating spatial distribution of a laser pulse.
Figure 3B:
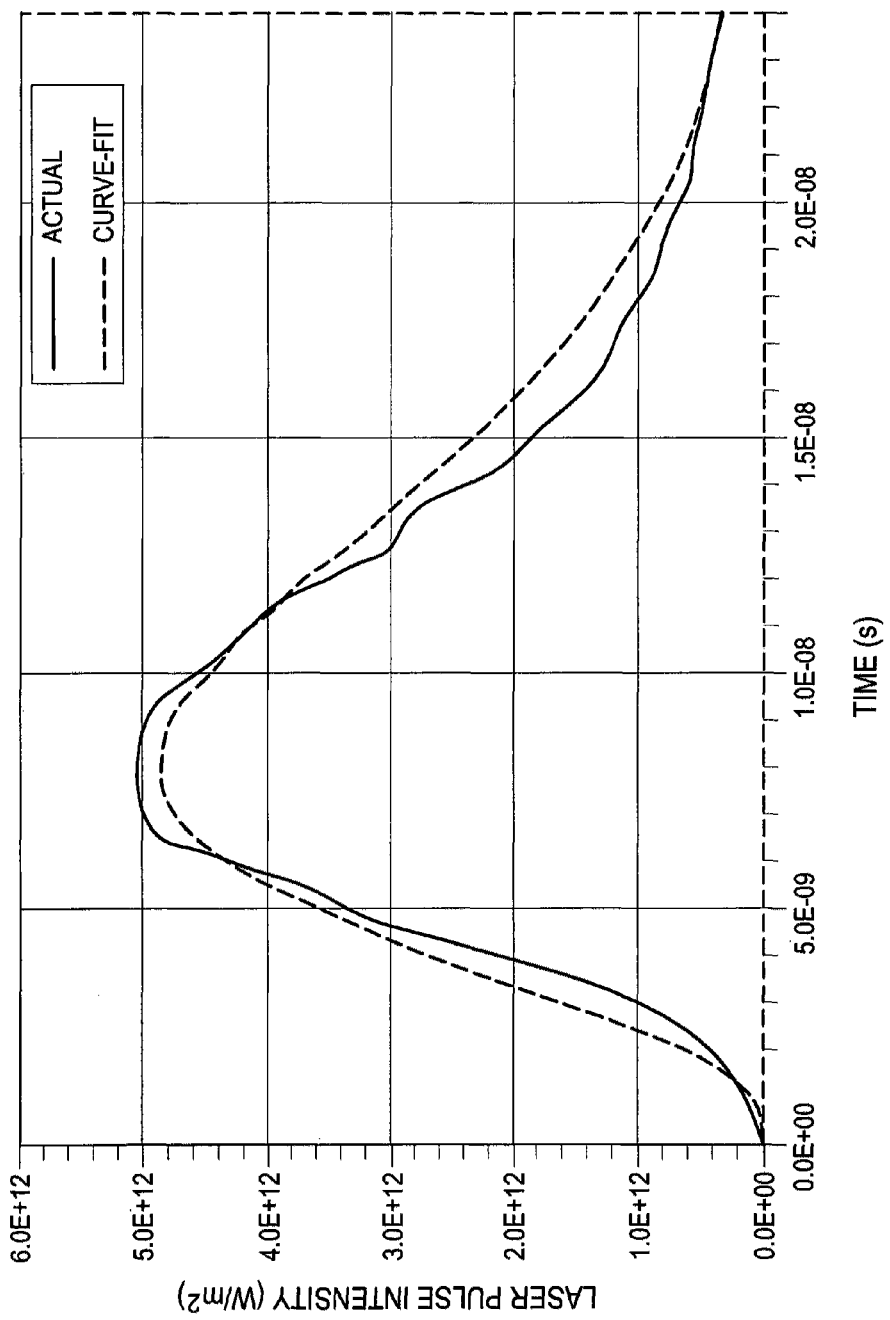
FIG. 3B is a chart illustrating temporal variation of the laser pulse of FIG. 3B.
Figure 4A:
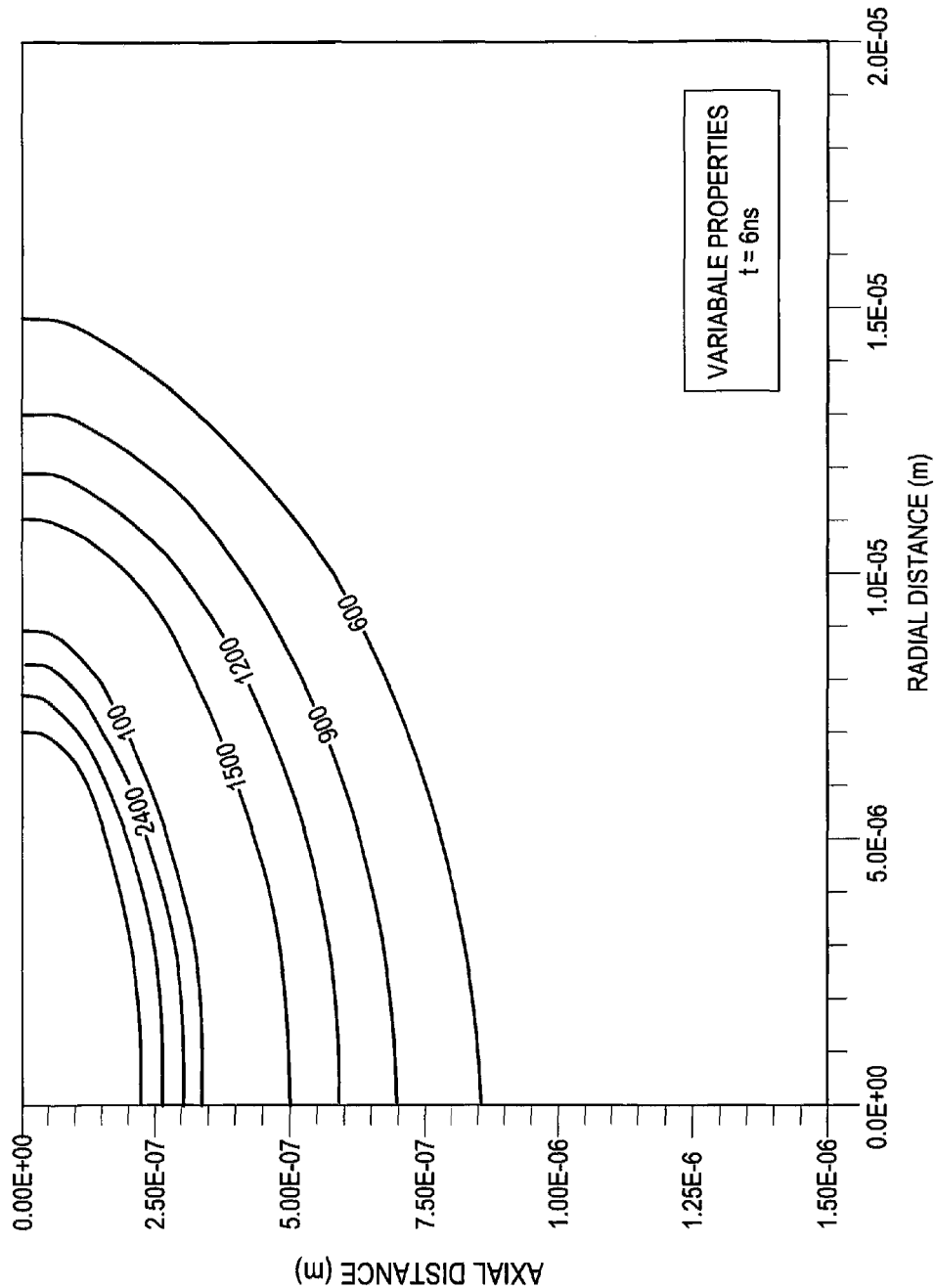
FIGS. 4A, 4B, 4C and 4D are charts illustrating temperature curves for constant and variable thermal properties cases of the method of modeling phase changes due to laser pulse heating according to the present invention.
Figure 4B:
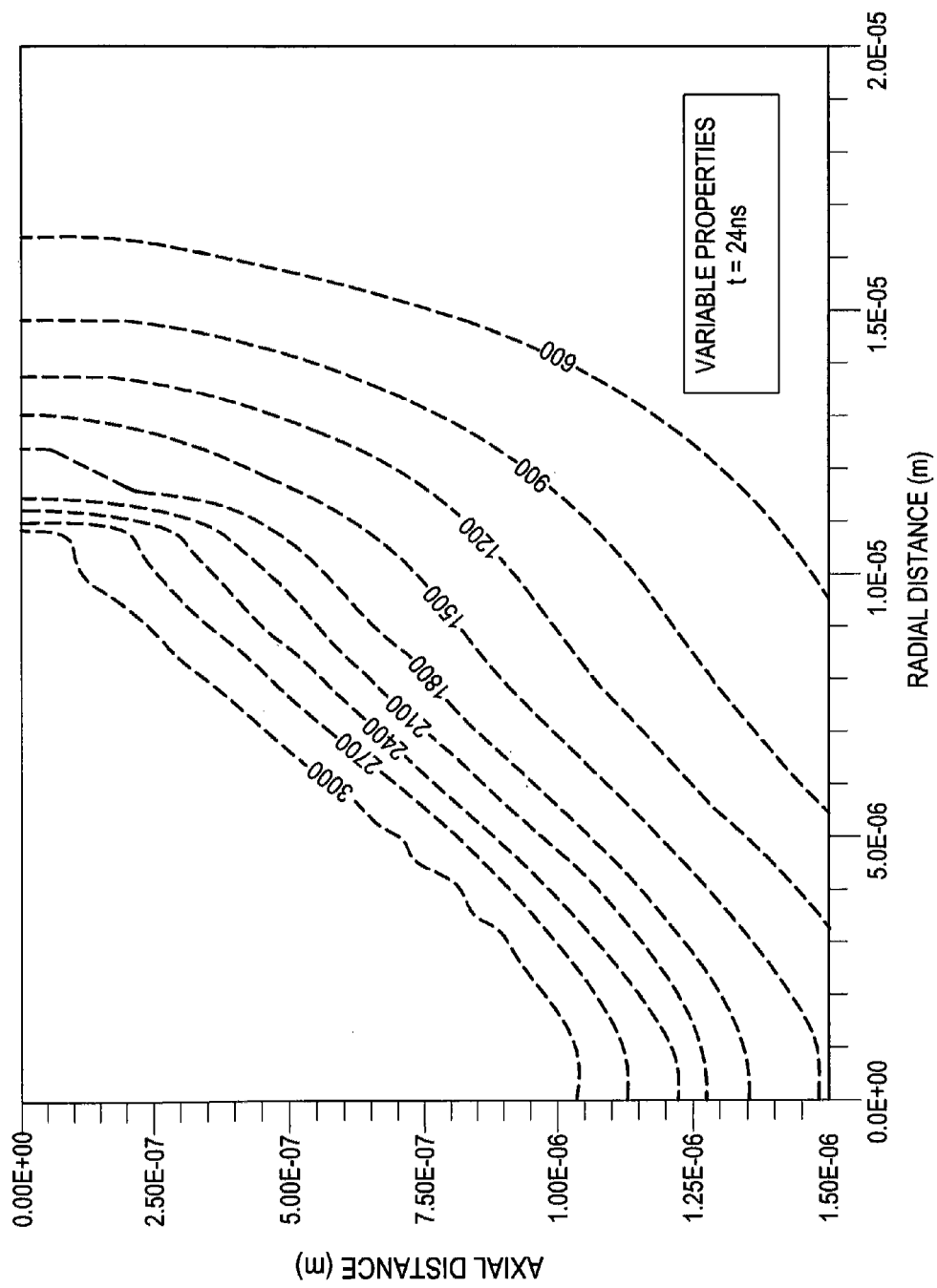
Figure 4C:
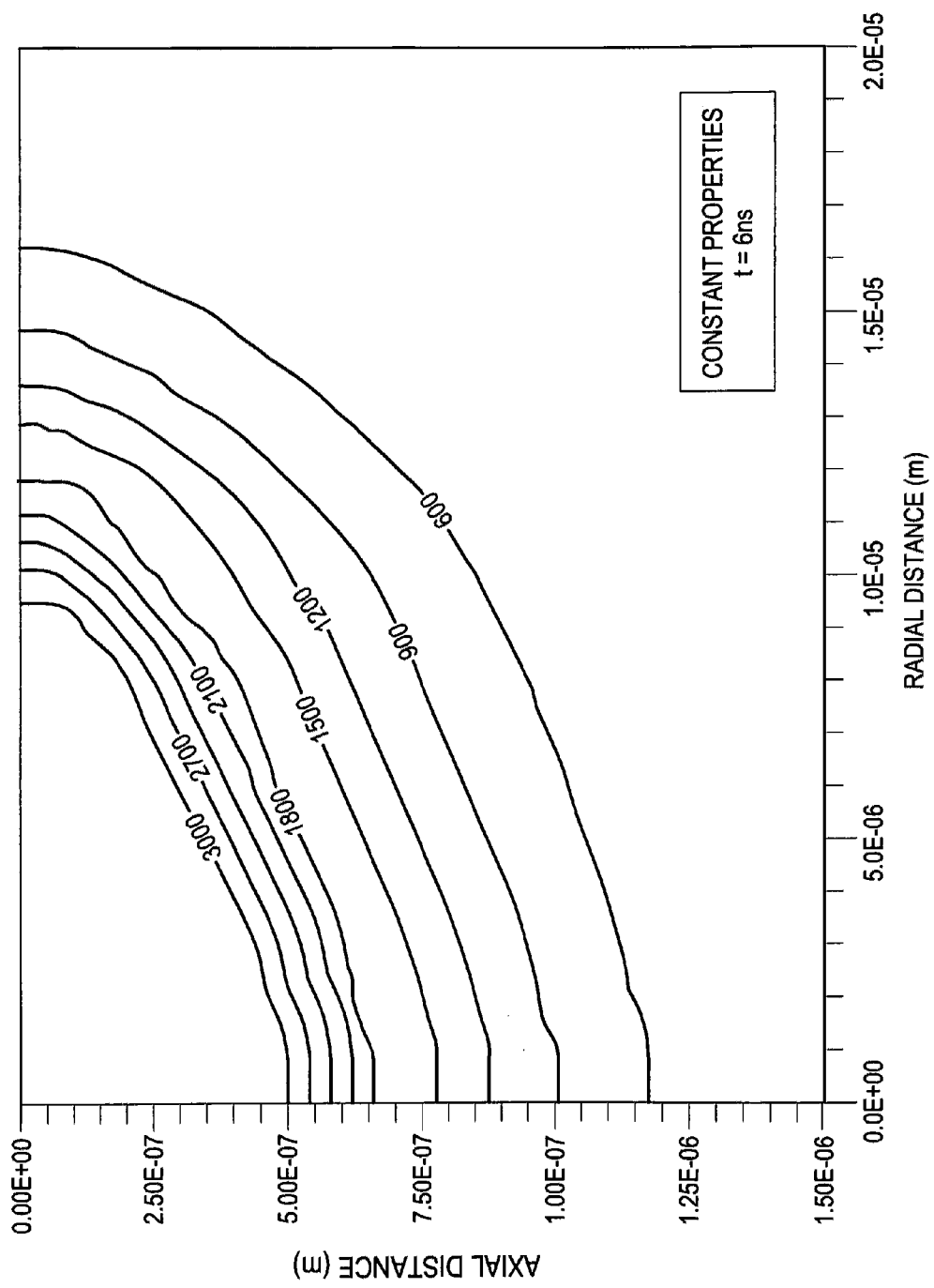
Figure 4D:
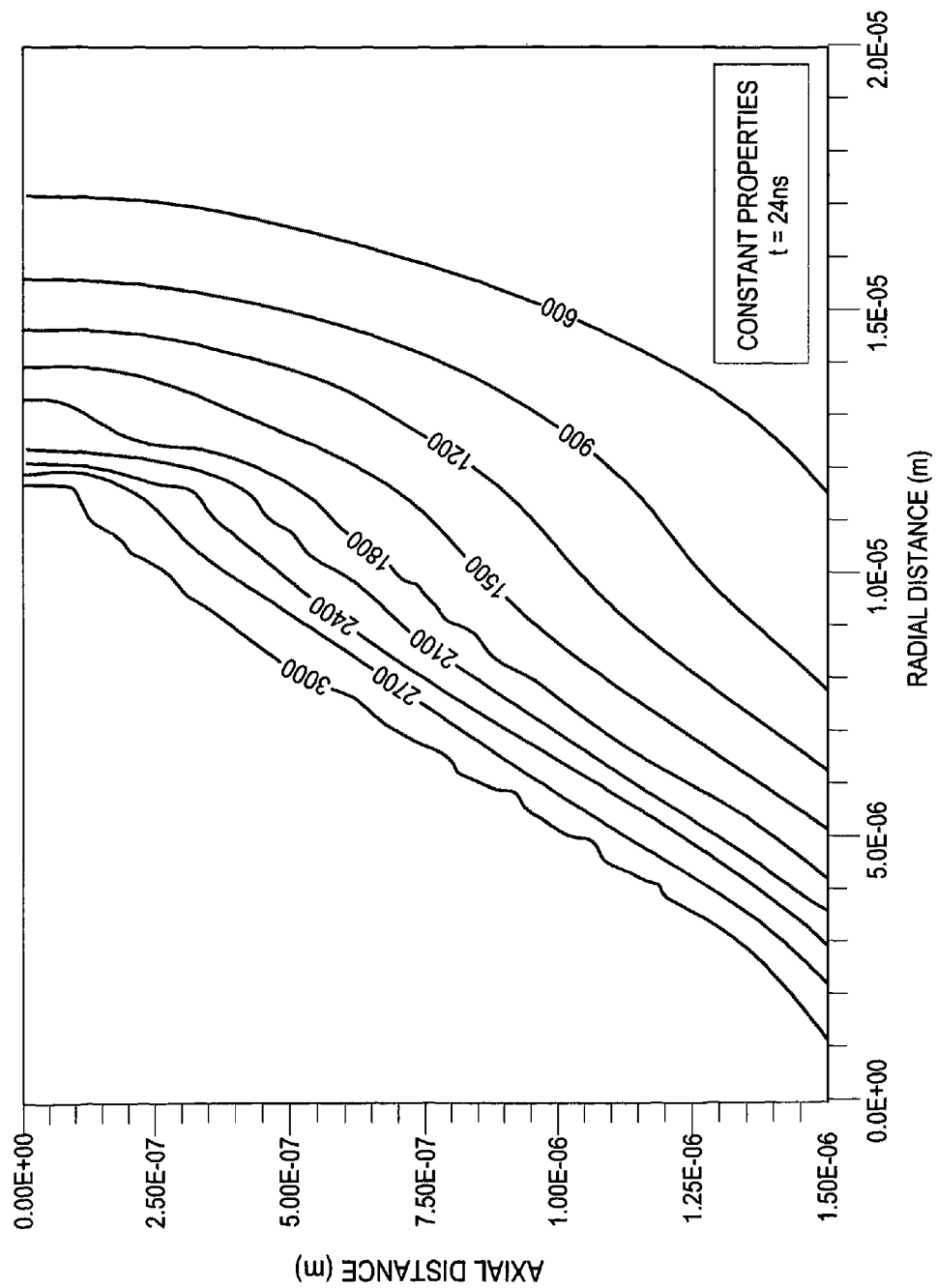

The radial temperature gradient in the liquid phase is large for the time period t>12 ns, which corresponds to the duration after the end of the laser pulse. This is true for temperature profiles in the liquid and solid phases. Thus, cooling of the surface results in a sharp decay of temperature in both phases after the end of the laser pulse. However, the size of the mushy zone in the radial direction is larger than that of the axial direction due to laser power intensity distribution in the radial direction at the surface, which is Gaussian. This situation is also shown in FIGS. 3A and 3B. In this case, laser power intensity at the surface reduces with increasing radial distance from the symmetry axis. This, in turn, enlarges the size of the mushy zone in the radial direction.

Figure 9A:
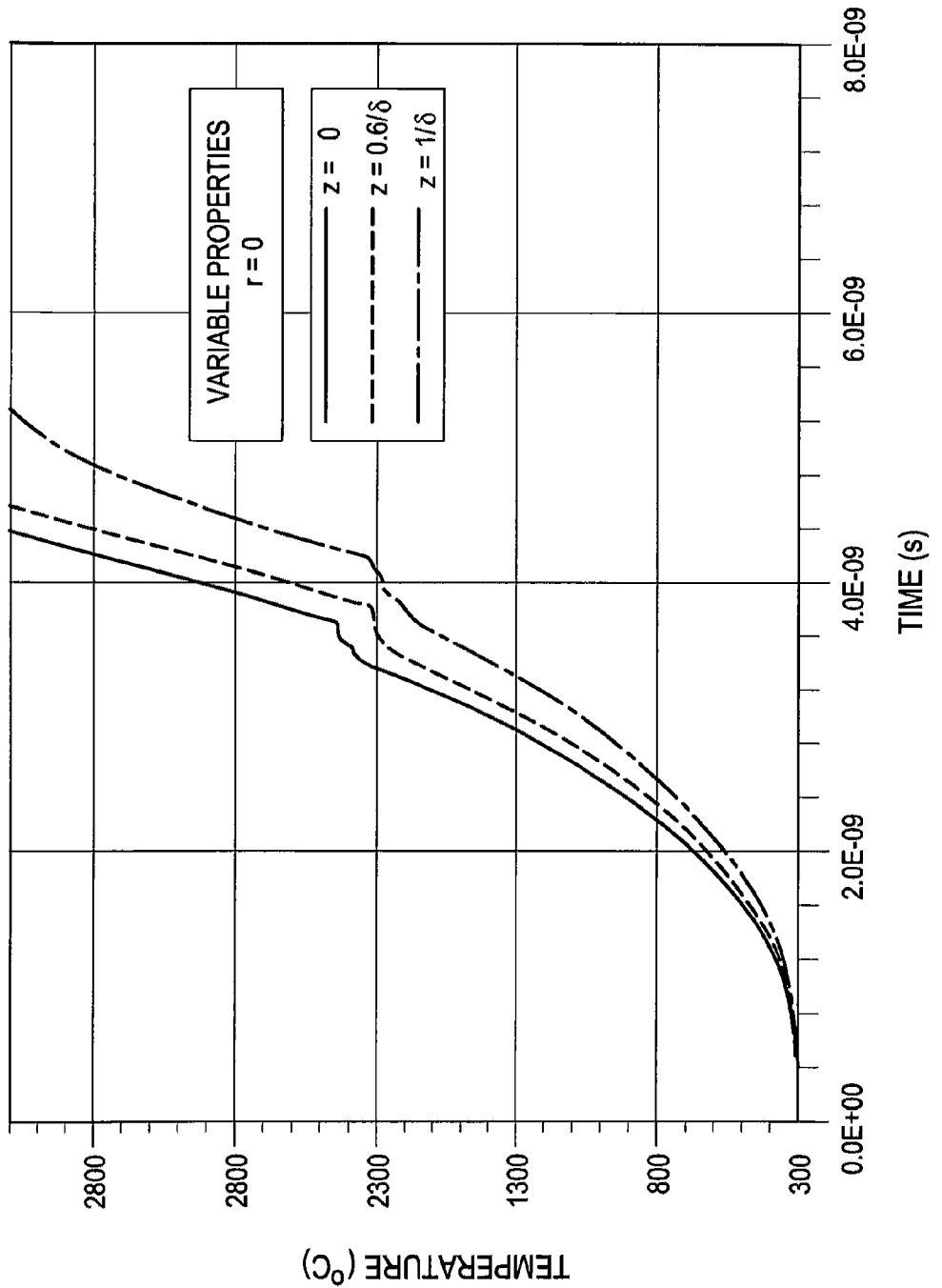
FIGS. 9A and 9B are charts illustrating temporal variation of temperature for the variable and constant thermal properties cases.
Figure 9B:
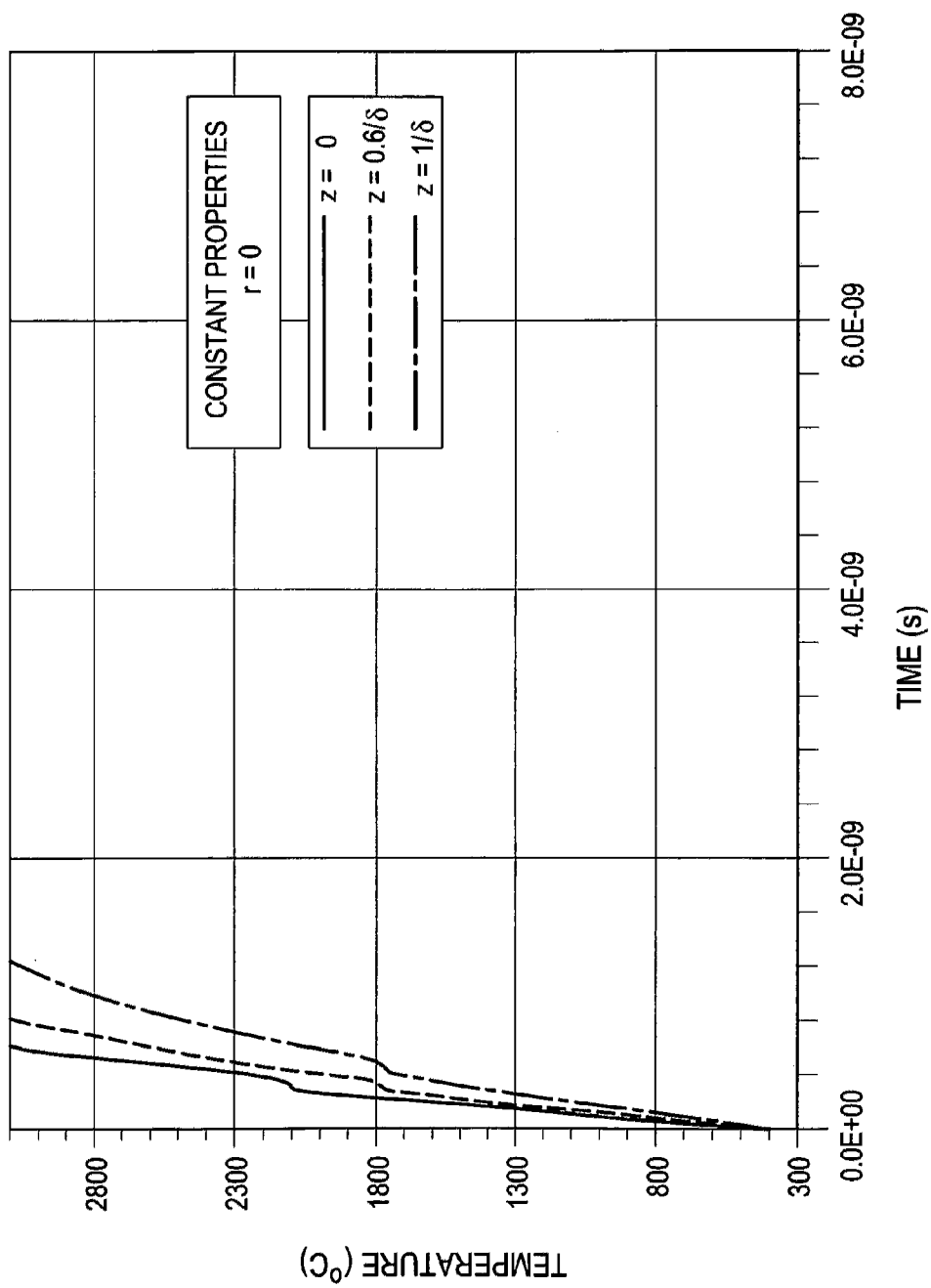

FIGS. 9A and 9B illustrate a temporal variation of temperature at the symmetry axis at different depths below the surface for the constant and variable thermal properties cases of the substrate material. In the case of constant properties, the rise of the temperature is rapid in the solid as well as in the liquid phases. This is more pronounced in the surface vicinity where the power intensity absorption is the highest. Increasing depth below the surface lowers the rise of temperature in both phases, in particular in the liquid phase. This is associated with the amount of absorbed radiated energy by the substrate material, which reduces with increasing depth from the surface (i.e., Lambert's Law). Further, the duration of constant melting temperature remains almost the same at different depths below the surface. This indicates that the duration of mushy zone formation in the substrate material remains almost constant with increasing depth, provided that the recession of the mushy zone into the substrate material may not be constant, since the time required for melting changes non-linearly as the depth below the surface increases.

When comparing the constant and variable thermal properties cases, temperature rise is slower in both phases for the variable thermal properties. This is more pronounced with increasing depth below the surface. The slow rise of temperature at the surface, despite reducing thermal conductivity with increasing temperature, is due to the increase of the specific heat capacity with temperature. In this case, reducing thermal conductivity with increasing temperature results in less energy dissipation from the irradiated surface towards the solid bulk, i.e., temperature is expected to rise in the surface region. However, increasing specific heat capacity with increasing temperature suppresses temperature rise in the surface region. Thus, large increases in the specific heat capacity with increasing temperature lowers temperature rise in the surface region despite the decrease in thermal conductivity. It should be noted that the magnitude of decrease in thermal conductivity between 100° C. and 1500° C. is 101.9 W/m/K, while the magnitude of increase in specific heat capacity between 100° C. and 1500° C. is 438 J/kg/K. Therefore, a large magnitude of increase in specific heat capacity is a response to the slow rise in temperature in the surface region. Further, the slow rise of temperature in the solid phase in the region close to the melting temperature, as well as the in the liquid phase close to the vapor temperature, is due to the mushy zones formed across the liquid-solid and vapor-liquid phases. Thus, the mushy zones act like a heat sink at the inter-phases, lowering the temperature rise in the inter-phase vicinity.

Figure 10A:
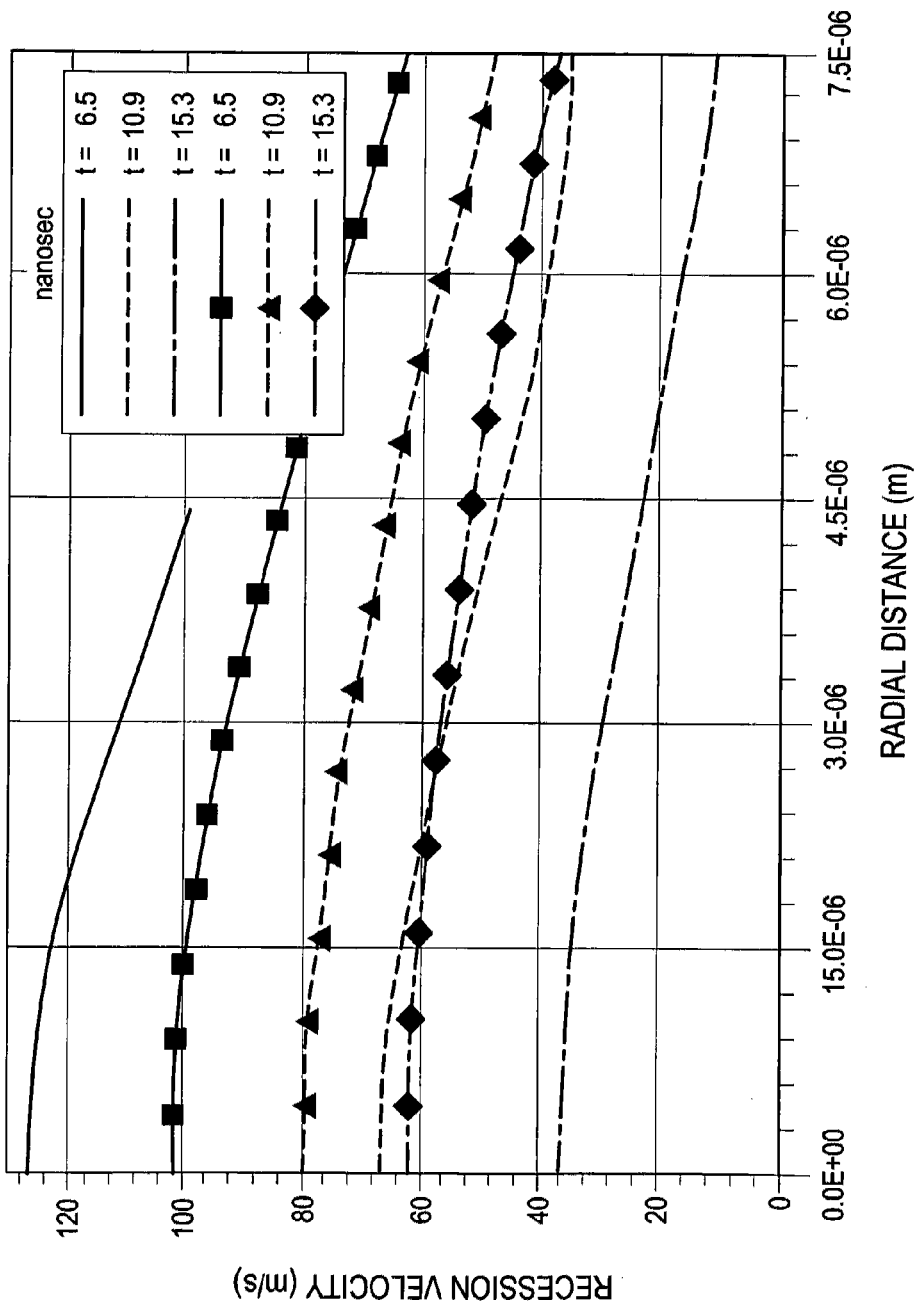
FIGS. 10A and 10B are charts illustrating recession velocity variation along the radial direction for the variable and constant thermal properties cases.
Figure 10B:
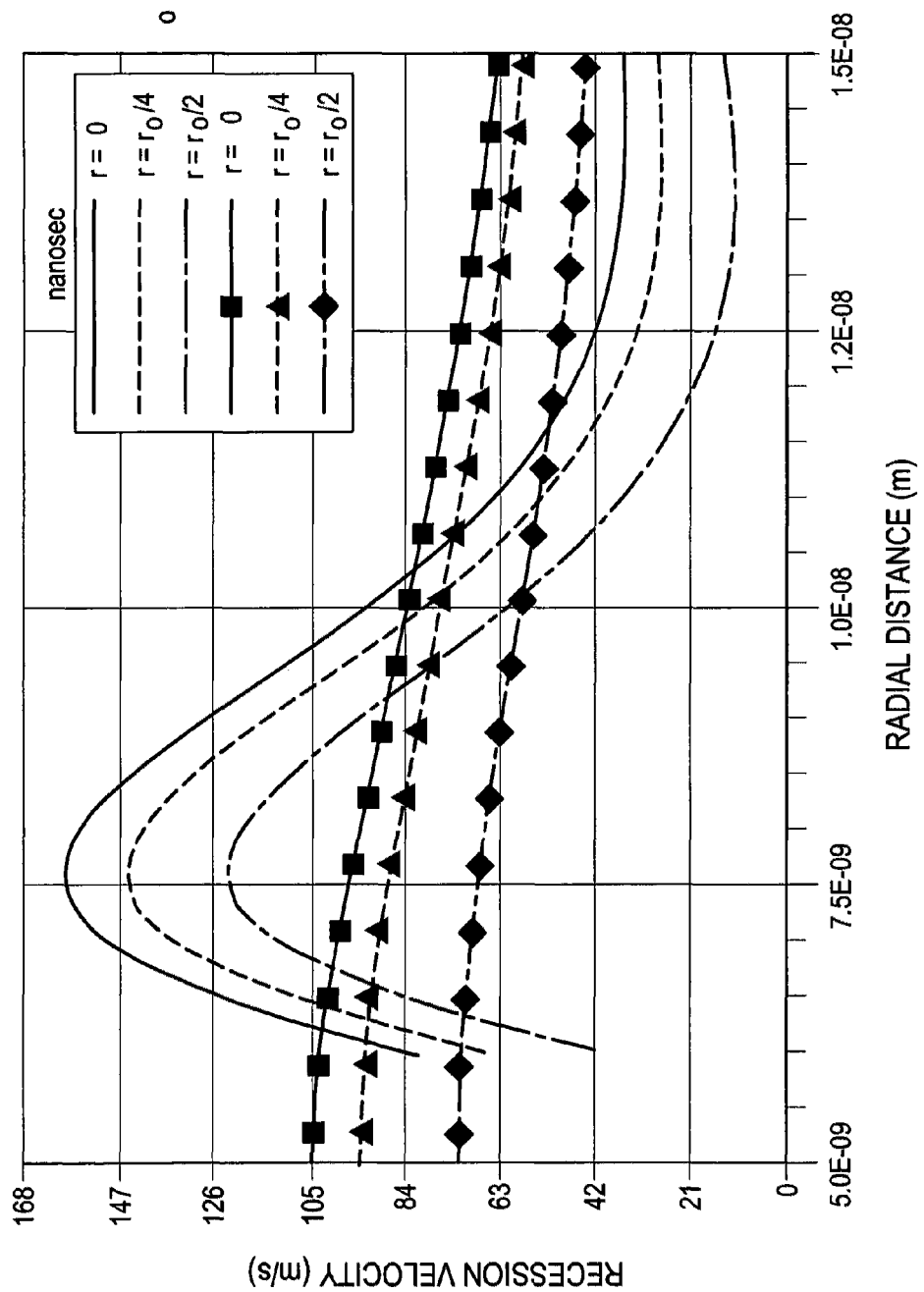

FIGS. 10A and 10B illustrate the recession velocity of the vapor-liquid surface along the radial direction for different heating periods. Recession velocity is higher along the symmetry axis and it reduces gradually with increasing radial distance from the symmetry axis. Recession of the liquid-solid surface towards the solid bulk is higher in the case of variable thermal properties than that of the constant properties case. This is true for heating periods t≦10.9 ns. The attainment of the high recession velocity for the variable thermal properties case is due to the small energy diffusion in the irradiated region due to low thermal conductivity at high temperatures. However, once the laser pulse intensity reduces significantly, the recession velocity also reduces significantly. In the case of variable thermal properties, low thermal conductivity at high temperatures results in higher recession velocity than that of constant properties in the cooling cycle (t=15.3 ns). Consequently, once the laser pulse intensity reduces, the recession velocity decreases for the variable thermal properties case. However, the decrease in recession velocity results in a small cavity depth because of the small rate of evaporation from the surface.

In the case of temporal variation of recession velocity at different radial locations for the constant and variable thermal properties cases, recession velocity initiates earlier for the constant properties case because of the early start of evaporation. In the case of variable thermal properties, recession velocity increases rapidly and reaches its maximum, then decays rapidly with progressing time. High recession velocity occurs during the period of 6-10 ns, when the laser power intensity is high. As the power intensity reduces with time, the recession velocity reduces. When comparing recession velocity due to the constant and variable thermal properties cases, recession velocity corresponding to the variable thermal properties case attains higher values than that of the constant properties case during the time period of 6-10 ns. This is because of increasing specific heat capacity with temperature, which, in turn, increases the internal energy gain of the substrate material at the vapor temperature. This accelerates the rate of operation at the surface. Further, low conductivity at high temperatures suppresses the thermal diffusion from the irradiated region to the solid bulk. This contributes to the enhancement of internal energy gain in the surface region. Consequently, evaporation rate increases further so that recession velocity increases.

Figure 11:
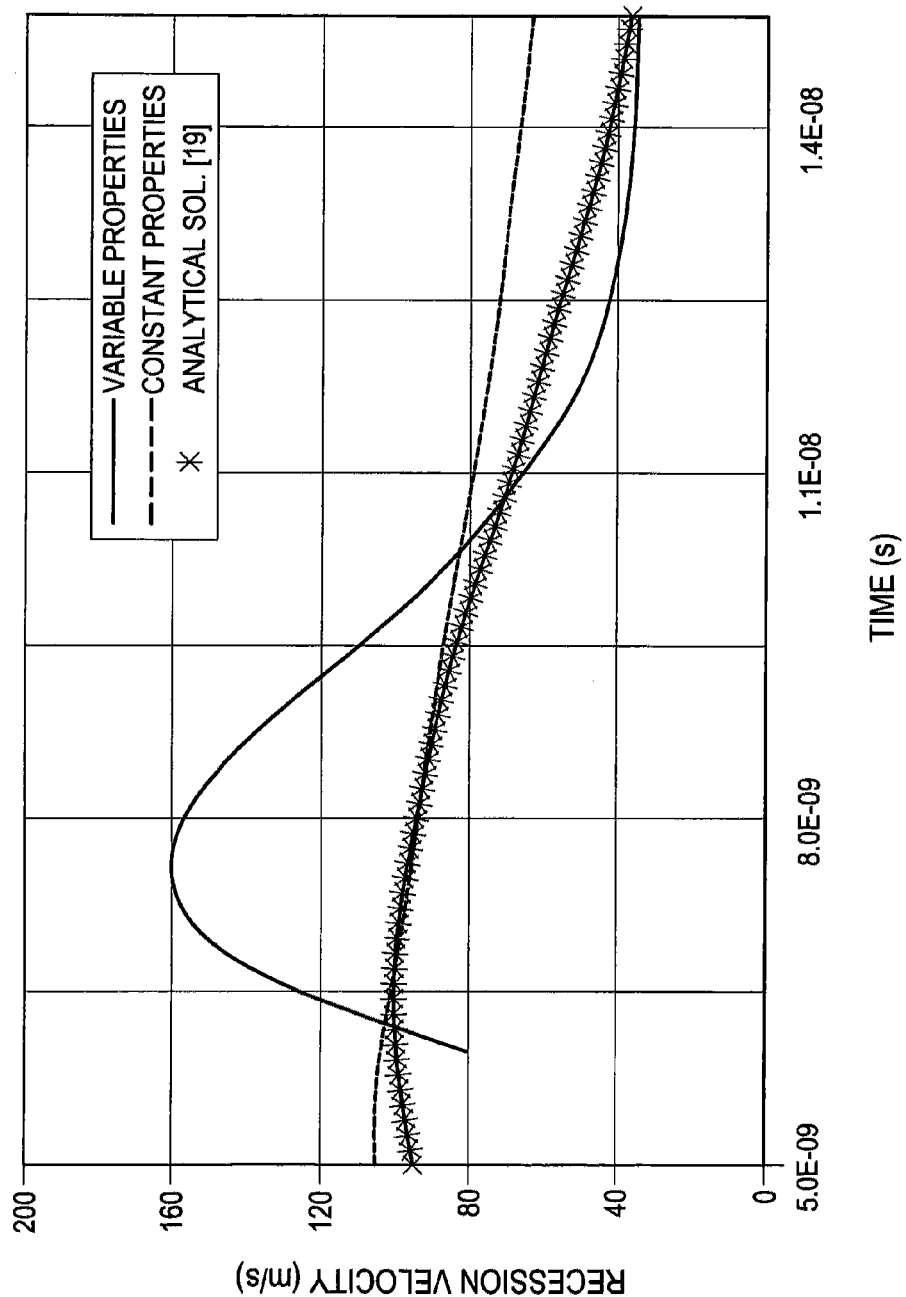
FIG. 11 is a chart illustrating a comparison of recession velocity calculated by the method of modeling phase changes due to laser pulse heating according to the present invention vs. a conventional analytical method.

FIG. 11 shows a comparison of recession velocity predicted from the variable and constant thermal properties cases vs. that obtained from an analytical solution. When comparing recession velocities, it can be observed that the recession velocity predicted for the constant properties case agrees well with the result of the analytical solution. It should be noted that the analytical solution is obtained for the constant properties case. Further, some small discrepancies between the result of the analytical solution and the predictions are due to the one-dimensional consideration in the analytical solution.

Figure 12:
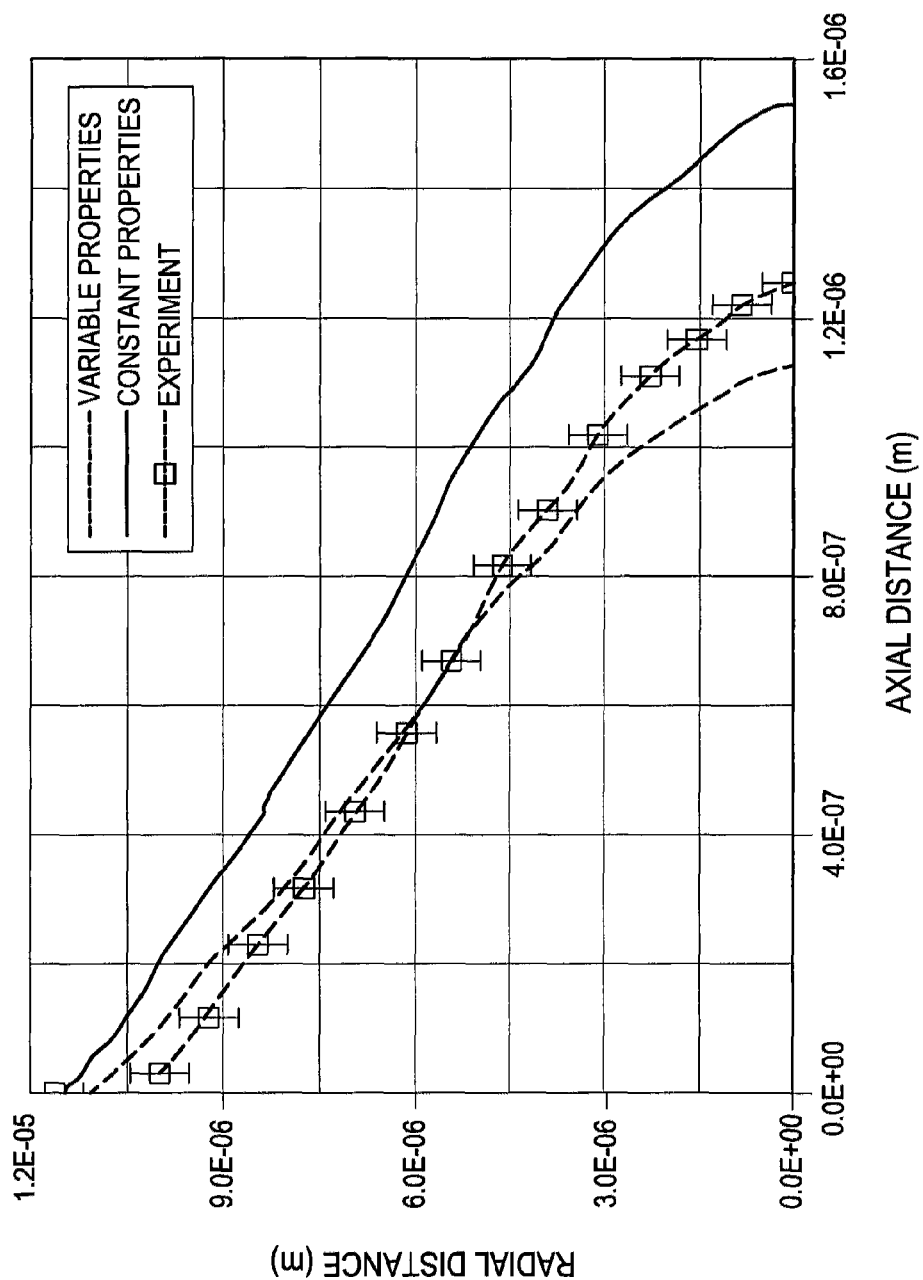
FIG. 12 is a chart illustrating a comparison of cavity profiles calculated by the method of modeling phase changes due to laser pulse heating according to the present invention vs. experimental results.

FIG. 12 illustrates a cavity shape predicted from the variable and constant thermal properties cases, as well as obtained from experiment. It can be observed that the cavity shape obtained from the variable thermal properties case agrees well with the experimental results.

Figure 13:
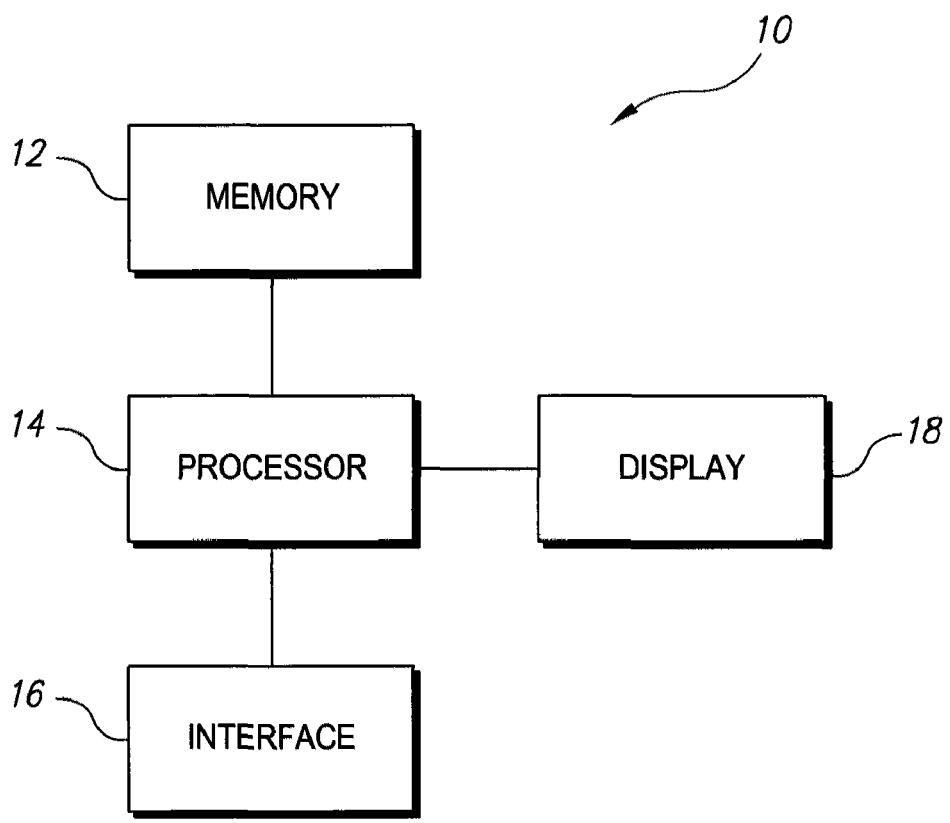
FIG. 13 is a block diagram of a system for implementing the method of modeling phase changes due to laser pulse heating according to the present invention.

In the above, the calculations may be performed by any suitable computer system, such as that diagrammatically shown in FIG. 13. Data is entered into system 10 via any suitable type of user interface 16, and may be stored in memory 12, which may be any suitable type of computer readable and programmable memory. Calculations are performed by processor 14, which may be any suitable type of computer processor and may be displayed to the user on display 18, which may be any suitable type of computer display.

It is to be understood that the present invention is not limited to the embodiments described above, but encompasses any and all embodiments within the scope of the following claims.

We claim:

1. A computerized method of modeling phase changes due to laser pulse heating, comprising the steps of
establishing a set of variables $S_0$, $I_o$, $r_f$, a, t, r, T, z, $\rho_s$, $c_{ps}$ and $k_s$, wherein the variable $S_0$ represents a volumetric source term, the variable $I_o$ represents a laser peak power intensity, the variable δ represents an absorption coefficient for a substrate material, the variable $r_f$ represents reflectivity of the substrate material, the variable a represents a Gaussian parameter, the variable t represents time, the variable r represents distance measured along a radial direction, T represents temperature, z represents an axial distance, $\rho_s$ represents a solid density, $c_{ps}$ represents a specific heat capacity of a solid phase of the substrate material, and $k_s$ represents a thermal conductivity of the solid phase of the substrate material;

calculating temperature variation and cavity depth in the substrate material due to laser heating for solid and liquid heating of the substrate material as $$\frac{\partial}{\partial t}(\rho_s c_{p_s} T) = \frac{1}{r}\frac{\partial}{\partial r}\left(k_s r \frac{\partial T}{\partial r}\right) + \frac{\partial}{\partial z}\left(k_s \frac{\partial T}{\partial z}\right) + S_o,$$

wherein $$S_o = I_o \delta(1 - r_f)\exp(-\delta z)\exp\left(-\frac{r^2}{a^2}\right);$$

establishing boundary conditions for the calculation of temperature variation and cavity depth in the substrate material for solid and liquid heating;

establishing a set of variables $\rho_m$, $L_m$, $x_m$, and $k_m$, wherein $\rho_m$ represents a density at a solid-liquid interface, $L_m$ represents a latent heat of melting, $x_m$ represents a mass fraction of liquid, and $k_m$ represents a thermal conductivity at the solid-liquid interface of the substrate material;

calculating temperature variation and cavity depth in the substrate material due to laser heating at the solid-liquid interface as $$\rho_m L_m \frac{\partial x_m}{\partial t} = \frac{1}{r}\frac{\partial}{\partial r}\left(k_m r \frac{\partial T}{\partial r}\right) + \frac{\partial}{\partial z}\left(k_m \frac{\partial T}{\partial z}\right) + S_o;$$

establishing a set of variables $\rho_b$, $L_b$, $x_b$, and $k_b$, wherein $\rho_b$ represents a density at a liquid-vapor interface, $L_b$ represents a latent heat of boiling, $x_b$ represents a mass fraction of vapor, and $k_b$ represents a thermal conductivity at the liquid-vapor interface of the substrate material;

calculating temperature variation and cavity depth in the substrate material due to laser heating at the liquid-vapor interface as $$\rho_b L_b \frac{\partial x_b}{\partial t} = \frac{1}{r}\frac{\partial}{\partial r}\left(k_b r \frac{\partial T}{\partial r}\right) + \frac{\partial}{\partial z}\left(k_b \frac{\partial T}{\partial z}\right) + S_o,$$

wherein calculation of temperature variation and cavity depth in the substrate material due to laser heating for solid and liquid heating, at the solid-liquid interface, and at the liquid-vapor interface is performed by discretization; and displaying numerical results of the calculated temperature variation and cavity depth in the substrate material due to laser heating for solid and liquid heating at the solid-liquid interface and at the liquid-vapor interface;

wherein the step of discretization comprises the steps of:

establishing a set of variables ρ, p, i, j, a, b, C, E, W, N, S and H, wherein p represents a time index, i represents an r-coordinate index, j represents a z-coordinate index, ρ represents density, and a, b, C, E, W, N, S and H are intermediate variables;

discretizing the calculation of temperature variation and cavity depth in the substrate material due to laser heating for solid and liquid heating as $$a_C T_{i,j}^p = a_E T_{i+1,j}^p + a_W T_{i-1,j}^p + a_N T_{i,j+1}^p + a_S T_{i,j-1}^p + T_{i,j}^{p-1} + a_H S_{i,j}^p,$$

wherein $$a_E = \frac{\alpha \Delta t(r_i + 0.5\Delta r)}{r_i(\Delta r)^2},$$

$$a_W = \frac{\alpha \Delta t(r_i - 0.5\Delta r)}{r_i(\Delta r)^2},$$

$$a_N = a_S = \frac{\alpha \Delta t}{(\Delta z)^2},$$

$$a_H = \frac{\Delta t}{\rho C p},$$

and $$a_C = 1 + a_E + a_W + a_N + a_S;$$

discretizing the calculation of temperature variation and cavity depth in the substrate material due to laser heating for the solid-liquid interface as $$x_{bi,j}^p =$$
$$c_E T_{i+1,j}^p - c_C T_{i,j}^p + c_W T_{i-1,j}^p + c_Z(T_{i,j+1}^p - 2T_{i,j}^p + T_{i,j-1}^p) + c_H S_{i,j}^p + x_{bi,j}^{p-1},$$

wherein $$c_E = \frac{\alpha_b C p_b \Delta t(r_i + 0.5\Delta r)}{L_b r_i(\Delta r)^2},$$

$$c_W = \frac{\alpha_b C p_b \Delta t(r_i - 0.5\Delta r)}{L_b r_i(\Delta r)^2},$$

$$c_C = c_E + c_W,$$

$$c_N = c_S = \frac{\alpha_b C p_b \Delta t}{L_b(\Delta z)^2},$$

and $$b_H = \frac{\Delta t}{\rho_b L_b};$$

discretizing the calculation of temperature variation and cavity depth in the substrate material due to laser heating for the liquid-vapor interface as $$x_{bi,j}^p = c_E T_{i+1,j}^p - c_C T_{i,j}^p + c_W T_{i-1,j}^p + c_Z(T_{i,j+1}^p - 2T_{i,j}^p + T_{i,j-1}^p) + c_H S_{i,j}^p + x_{bi,j}^{p-1},$$

wherein $$c_E = \frac{\alpha_b Cp_b \Delta t (r_i + 0.5\Delta r)}{L_b r_i (\Delta r)^2},$$

$$c_W = \frac{\alpha_b Cp_b \Delta t (r_i - 0.5\Delta r)}{L_b r_i (\Delta r)^2},$$

$$c_C = c_E + c_W,$$

$$c_N = c_S = \frac{\alpha_b Cp_b \Delta t}{L_b (\Delta z)^2},$$

and $$b_H = \frac{\Delta t}{\rho_b L_b}.$$

2. The computerized method of modeling phase changes due to laser pulse heating as recited in claim 1, wherein the boundary conditions for the calculation of temperature variation and cavity depth in the substrate material at the solid-liquid interface are set as T for both r and z being modeled as being an infinite distance from the substrate material being equal to $T_0$, wherein $T_0$ represents an initial temperature of the substrate material.

3. The computerized method of modeling phase changes due to laser pulse heating as recited in claim 2, wherein at an axis of symmetry of the substrate material, $$\frac{\partial T(0, z, t)}{\partial r} = 0,$$

and at a surface of the substrate material, $$k\frac{\partial T(r, 0, t)}{\partial z} = h(T(r, 0, t) - T_0),$$

wherein h represents a convective heat transfer coefficient at the surface of the substrate material and k represents thermal conductivity at the surface of the substrate material.

4. The computerized method of modeling phase changes due to laser pulse heating as recited in claim 3, wherein an energy content $\Delta U$ of a differential element having a volume $\Delta\forall$ at a melting temperature $T_m$ of the substrate material in the calculation of temperature variation and cavity depth at the solid-liquid interface is given by $\Delta U = \rho_m \Delta\forall [x_m(L_m + c_{p_m}(T_m - T_{ref})) + c_{p_s}(1-x_m)(T_m - T_{ref})]$, wherein $c_{pm}$ represents a specific heat capacity at the solid-liquid interface and $T_{ref}$ represents a reference temperature.

5. The computerized method of modeling phase changes due to laser pulse heating as recited in claim 4, wherein the mass fraction of liquid $x_m$ is given by $$x_m = \frac{m_m}{m_m + m_s},$$

wherein $m_m$ represents a liquid mass and in represents a solid mass.

6. The computerized method of modeling phase changes due to laser pulse heating as recited in claim 1, wherein for the solid phase, $\rho = \rho_s$ and $$Cp = Cp_s(T), \text{ where } \alpha = \frac{k_s(T)}{\rho_s Cp_s(T)}.$$

7. The computerized method of modeling phase changes due to laser pulse heating as recited in claim 1, wherein for a liquid phase, $\rho = \rho_l$ and $$Cp = Cp_l(T), \text{ where } \alpha = \frac{k_l(T)}{\rho_l Cp_l(T)}.$$

* * * * *